(12) United States Patent
Bédard et al.

(10) Patent No.: US 7,032,915 B2
(45) Date of Patent: Apr. 25, 2006

(54) DETACHABLE WINDSHIELD FOR SNOWMOBILE

(75) Inventors: Yvon Bédard, Orford-Lac Bowker (CA); Jean-François Desmarais, Racine (CA)

(73) Assignee: Bombardier Recreational Products Inc., Volcourt (CA)

( * ) Notice: Subject to any disclaimer, the term of this patent is extended or adjusted under 35 U.S.C. 154(b) by 285 days.

(21) Appl. No.: 10/014,803

(22) Filed: Dec. 14, 2001

(65) Prior Publication Data

US 2002/0084126 A1 Jul. 4, 2002

Related U.S. Application Data

(60) Provisional application No. 60/255,113, filed on Dec. 14, 2000.

(51) Int. Cl.
*B62J 17/00* (2006.01)

(52) U.S. Cl. ............... 280/288.4; 280/304.3; 296/78.1

(58) Field of Classification Search ........... 280/288.4, 280/304.3; 296/77.1, 78.1; 180/190
See application file for complete search history.

(56) References Cited

U.S. PATENT DOCUMENTS

| | | | | |
|---|---|---|---|---|
| 3,819,226 A | * | 6/1974 | Sykora | 296/90 |
| 3,993,347 A | * | 11/1976 | Bombardier | 296/90 |
| 3,997,212 A | * | 12/1976 | Tesch | 296/96.21 |
| 4,087,110 A | * | 5/1978 | Vetter | 296/78.1 |
| 4,141,567 A | * | 2/1979 | Scott | 280/304.3 |
| 4,249,626 A | * | 2/1981 | Fields et al. | 180/68.1 |
| 4,489,973 A | * | 12/1984 | Willey | 296/78.1 |
| 4,633,964 A | * | 1/1987 | Boyer et al. | 180/190 |
| 4,830,423 A | * | 5/1989 | Nebu et al. | 296/78.1 |
| 5,129,473 A | * | 7/1992 | Boyer | 180/68.1 |
| 5,152,365 A | * | 10/1992 | Aoshima | 180/68.3 |
| 5,251,718 A | * | 10/1993 | Inagawa et al. | 180/190 |
| 5,660,245 A | * | 8/1997 | Marier et al. | 180/190 |
| 5,832,786 A | * | 11/1998 | Risley | 74/551.8 |
| 6,176,538 B1 | * | 1/2001 | Lawson et al. | 296/78.1 |
| 6,234,554 B1 | * | 5/2001 | Willey | 296/78.1 |
| 6,454,037 B1 | * | 9/2002 | Atsuumi et al. | 180/190 |
| 6,543,831 B1 | * | 4/2003 | Takemura et al. | 296/78.1 |
| 6,561,297 B1 | * | 5/2003 | Yatagai et al. | 180/190 |
| 6,752,447 B1 | * | 6/2004 | Gagne | 296/92 |

* cited by examiner

*Primary Examiner*—Lesley D. Morris
*Assistant Examiner*—L. Lum
(74) *Attorney, Agent, or Firm*—Osler, Hoskin & Harcourt LLP

(57) ABSTRACT

A snowmobile includes a detachable windshield assembly in generally overlying relation to the hood assembly. The snowmobile includes a windshield assembly with a windshield support frame that includes a plurality of elongated support frame members. Each of the plurality of elongated support frame members is laterally spaced from one another and includes at least a windshield locking structure. A windshield is detachably mounted to the windshield locking structure by at least a releasable securing structure attached to the windshield.

15 Claims, 21 Drawing Sheets

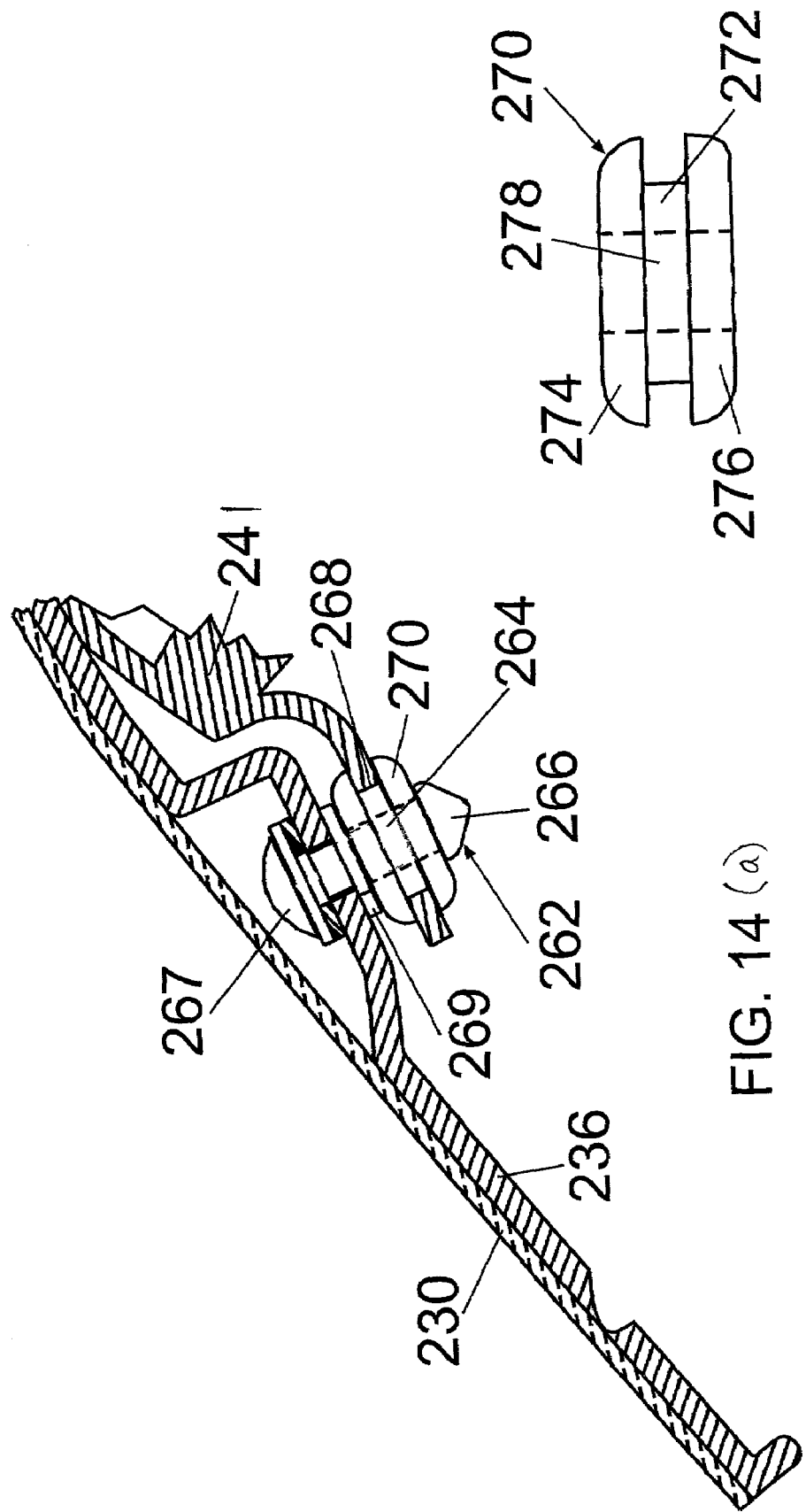

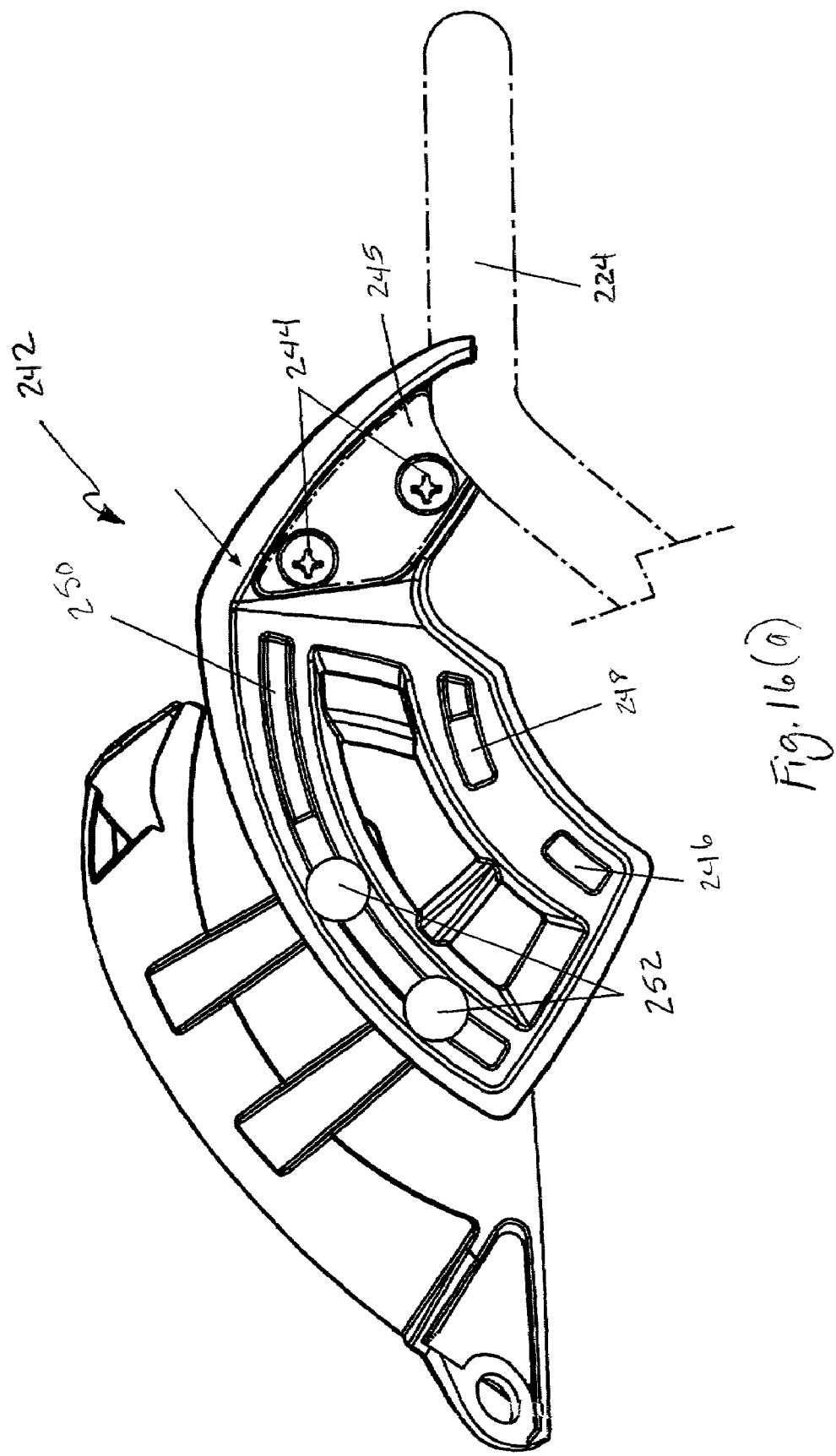

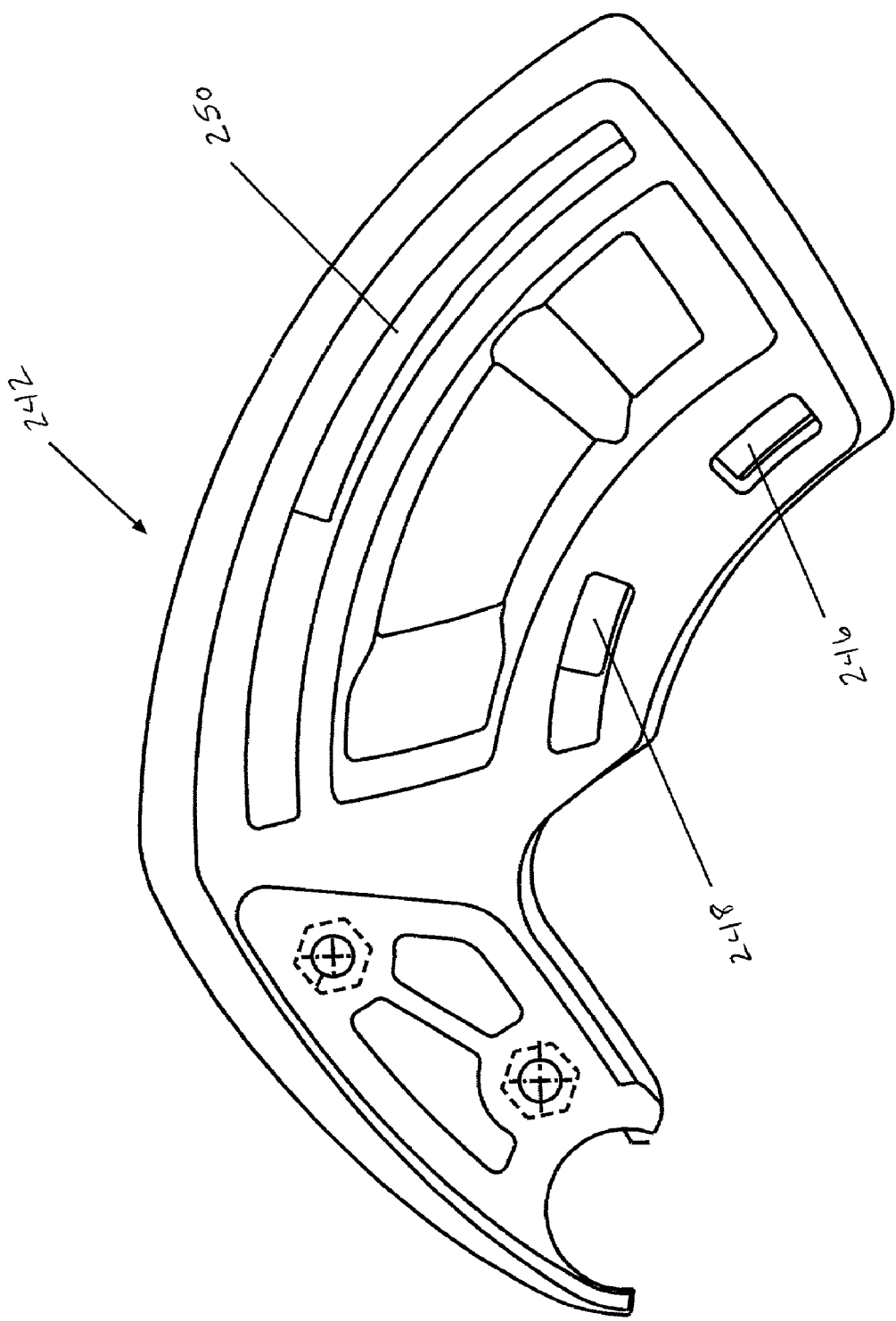

DETACHABLE WINDSHIELD FOR SNOWMOBILE

This application claims the benefit of U.S. Provisional Patent Application Ser. No. 60/255,113, which was filed on Dec. 14, 2000, entitled "DETACHABLE WINDSHIELD FOR SNOWMOBILES."

FIELD OF THE INVENTION

The present invention relates to a windshield assembly for snowmobiles and, more particularly, to a windshield assembly that can be detached from the snowmobile in case of severe impact.

BACKGROUND OF THE INVENTION

Conventionally, a snowmobile has an endless track at its rear portion for propulsion, a rear suspension that connects the track to the frame of the snowmobile, a front suspension that operatively connects a pair of skis at the forward section of the snowmobile to a steering assembly for steering, and power train components—including an engine and a continuously variable transmission mounted on the frame of the snowmobile—that provides propulsion power to the track. Further, a seat is provided for a rider and/or passengers which is positioned generally above the endless track. At the front portion of the snowmobile, fairings—typically comprising a hood as its upper component and a bottom pan as its bottom component—are provided to encase the engine and other power train components and to provide an outer shell that can be used for aesthetic decorations.

In snowmobiles, a windshield is provided to protect the user from wind and debris to which the rider typically is exposed when the snowmobile is in motion. Such windshields are generally clear or transparent structures mounted on the upper and rear section of the hood of the vehicle as shown in FIG. 9. In the arrangement shown in FIG. 9, the windshield 510 is mounted fixedly to the portion of the hood 512 which surrounds the handlebar 514 of the steering assembly. Thus, since the windshield 510 is mounted on the hood of the fairings 516, the windshield 510 does not move. These types of snowmobile windshields are typically of substantial size since they cover the entire semicircular area on the fairings surrounding the handlebar.

FIG. 10 shows another arrangement for attaching a windshield on a snowmobile which exists in the prior art. The windshield 520 shown in FIG. 10, in contrast to the windshield 510 shown in FIG. 9, is not attached to the hood 522 of the snowmobile, but rather is fixedly connected to the steering assembly 526 of the snowmobile. In this arrangement, the windshield 520 rotates with the turning of the handlebar 528 of the steering assembly 526. As can be seen, the windshield 520 tends to be smaller in size by comparison with the windshield 510 shown in FIG. 9 as it does not extend entirely around the semicircular area around the handlebar on the hood. More specifically, the windshield 520 is fixedly connected to the upper portion of the steering column of the steering assembly 526.

For both types of the conventional windshields discussed above, the windshields are fixedly attached to the hood or the steering assembly of the snowmobiles. Typically, conventional windshields are bolted to or screwed onto the hood or steering assembly member. One significant drawback to these windshields is that if the snowmobile turns over, the windshield may be damaged when the weight of the snowmobile comes to rest on the windshield.

Additionally, snowmobiles may be shipped from the factory without the windshield attached. In such a case, the snowmobile windshield must be mounted onto the snowmobile as a post-shipping operation, for example, at the dealership. The assembly time and costs incurred by the factory and/or dealer when mounting the windshield to the snowmobile may be attributed to or associated with a relatively difficult installation operation. Most of these windshields, when rigidly mounted to the snowmobile, are not removable or replaceable by the user, thus requiring factory or dealer assistance. This increases maintenance and replacement costs.

Consequently, there is a need for a quick release or detachable windshield that can be easily mounted on existing snowmobiles or can be easily manufactured as a part of new snowmobiles. Preferably, such a structure attaches easily to the steering column and detaches quickly, with appropriate force, from the snowmobile in the case of a severe impact.

SUMMARY OF THE INVENTION

An objective of the present invention is to meet the need expressed above. This need is met by providing a detachable windshield assembly for a snowmobile.

According to the present invention, the snowmobile includes a chassis, a motor disposed on the chassis, and a ground engaging endless track disposed below the chassis and operatively connected to the motor. At least one ski is disposed on the chassis. A steering mechanism is operatively connected to the at least one ski. A support frame is mounted to the steering mechanism. The support frame has at least two elongated support frame members laterally spaced from one another, at least one locking structure disposed on the support frame, and a windshield detachably mounted to the support frame via the locking structure.

According to the invention, a detachable windshield assembly is provided or used on the snowmobile. The detachable windshield assembly, constructed according to the invention, is provided in generally overlying relation to the hood assembly. The detachable windshield assembly includes a windshield support frame which is adapted to be mounted to a steering mechanism of a vehicle. The windshield support frame includes a plurality of elongated support frame members spaced apart from one another, a locking structure provided on the windshield support frame and or the detachable windshield assembly, providing a windshield detachably connectable to the support frame via the locking structure.

The present invention provides exemplary embodiments of a detachable windshield assembly that can be easily incorporated in a snowmobile during the manufacturing thereof so that a wide range of snowmobiles can be manufactured having detachable windshield assemblies incorporated thereon. The invention also provides embodiments of a detachable windshield assembly that can be constructed separately from snowmobiles to be mountable on a wide range of snowmobiles that have conventional, non-detachable windshields, such as those shown in FIGS. 9 and 10, so that a conventionally constructed snowmobile can be easily modified to include a detachable windshield assembly constructed according to the principles of the present invention.

BRIEF DESCRIPTION OF THE DRAWINGS

Various embodiments of the present invention are illustrated throughout the drawings, in which:

FIG. 14(a) is a partial cross-sectional view taken along line 14—14 in FIG. 11 showing the locking structure of the detachable windshield in greater detail;

FIG. 14(b) is an enlarged view of grommet 270 shown in FIG. 14(a);

FIG. 16(a) is a perspective view of the attachment links between the steering mechanism and the detachable windshield assembly, shown in a first position;

FIG. 17 is an exploded view of an attachment plate shown in FIG. 16, which is attached to the steering mechanism on the snowmobile;

DETAILED DESCRIPTION OF THE INVENTION

Figure 1:
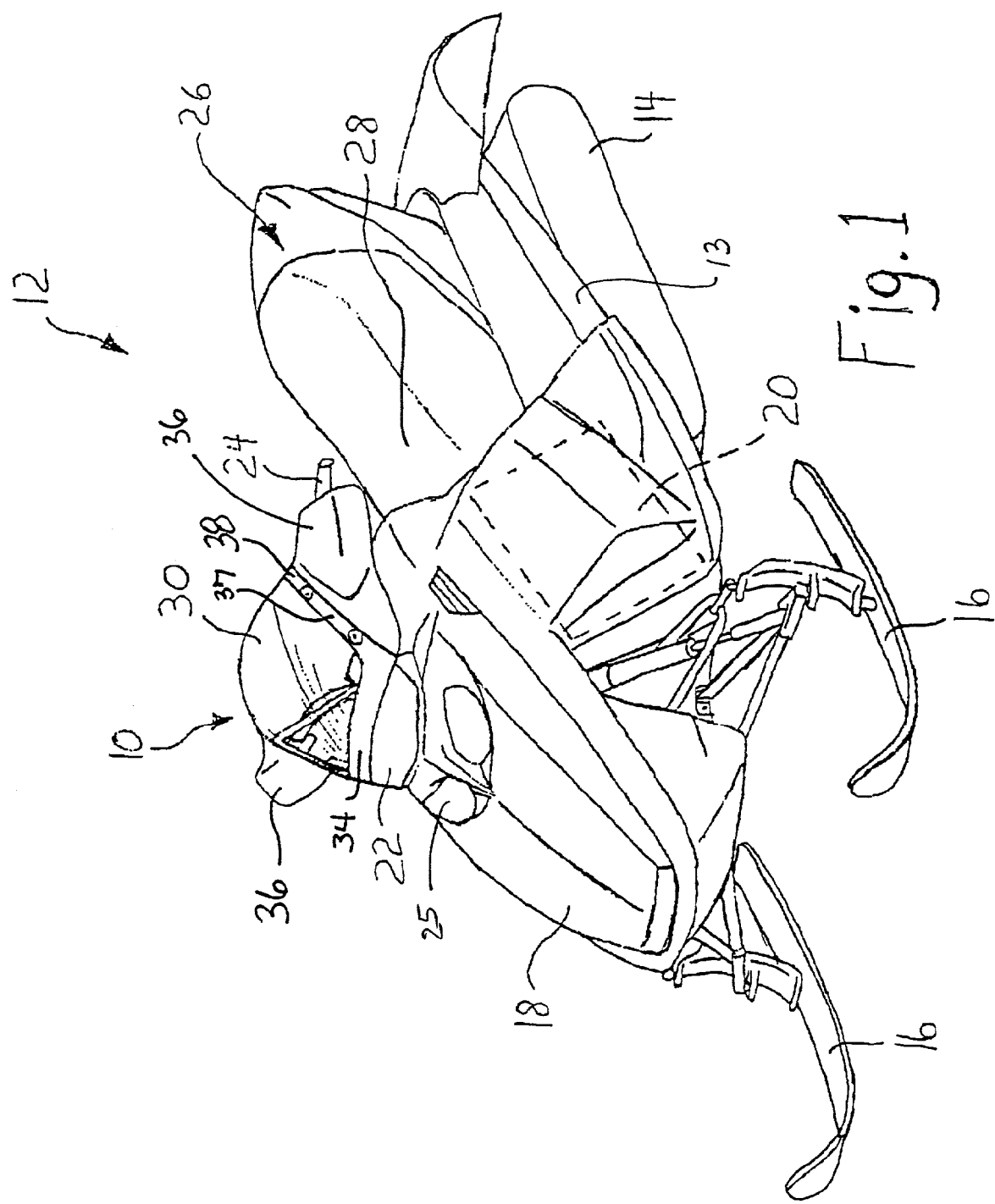
FIG. 1 is a perspective view of a snowmobile with a first exemplary embodiment of a detachable windshield assembly constructed according to the principles of the present invention mounted thereon.

FIG. 1 shows an exemplary embodiment of a detachable windshield panel assembly, generally designated 10, that is constructed according to the principles of the present invention. The detachable windshield 10 is shown mounted on a snowmobile 12. The snowmobile 12 includes a chassis 13, a ground engaging endless track 14 disposed below the chassis 13 and ski structure 16 disposed on the chassis 13 at a front end. A hood structure 18 covers a driving motor 20 (shown in phantom) mounted in the front portion of the snowmobile 12. The endless track 14 is driven by the motor 20 to propel the snowmobile 12 along a ground surface. The ski structure 16, which may include one or two ski members, is controllable through a steering mechanism 24 to steer the snowmobile 12.

The hood structure 18 includes a generally U-shaped ledge assembly 22 that is fixed in relation to the hood structure 18 and is positioned generally forwardly of the steering mechanism 24 above a lighting assembly 25. The U-shaped ledge assembly 22, among other structures, defines a driver station 26 generally rearwardly thereof.

The steering mechanism 24, in the form of a handlebar, is configured and positioned to be gripped by a driver (not shown) seated on a seat portion 28 of the driver station 26. The steering mechanism 24 rotates with respect to the ledge assembly 22 to provide directional steering control to the snowmobile 12.

The seat portion 28 shown in FIG. 1 may be sized to accommodate (1) a driver and (2) a passenger rearwardly of and in tandem with the driver. It is understood, however, that this is exemplary only and not intended to limit the use of a detachable windshield assembly 10 constructed according to the principles of the present invention to snowmobiles 12 that accommodate only one or two people. A seat portion that accommodates more people could be provided on the snowmobile 12. For example, the detachable windshield assembly 10 may be provided on a snowmobile including a seat portion that is sized to accommodate three riders.

Figure 2:
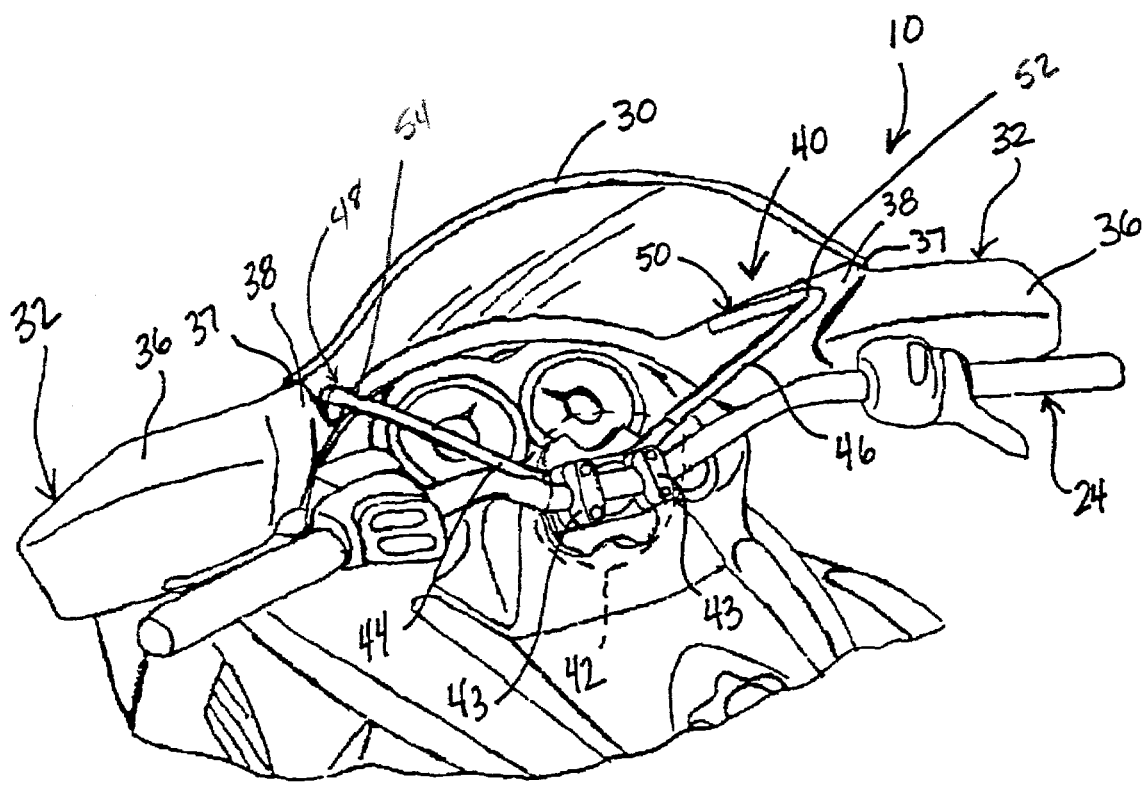
FIG. 2 is a fragmentary perspective view of the first exemplary embodiment of the detachable windshield assembly mounted on the snowmobile, showing the cover member in phantom to better illustrate the windshield support frame mounted to the steering mechanism.
Figure 3:
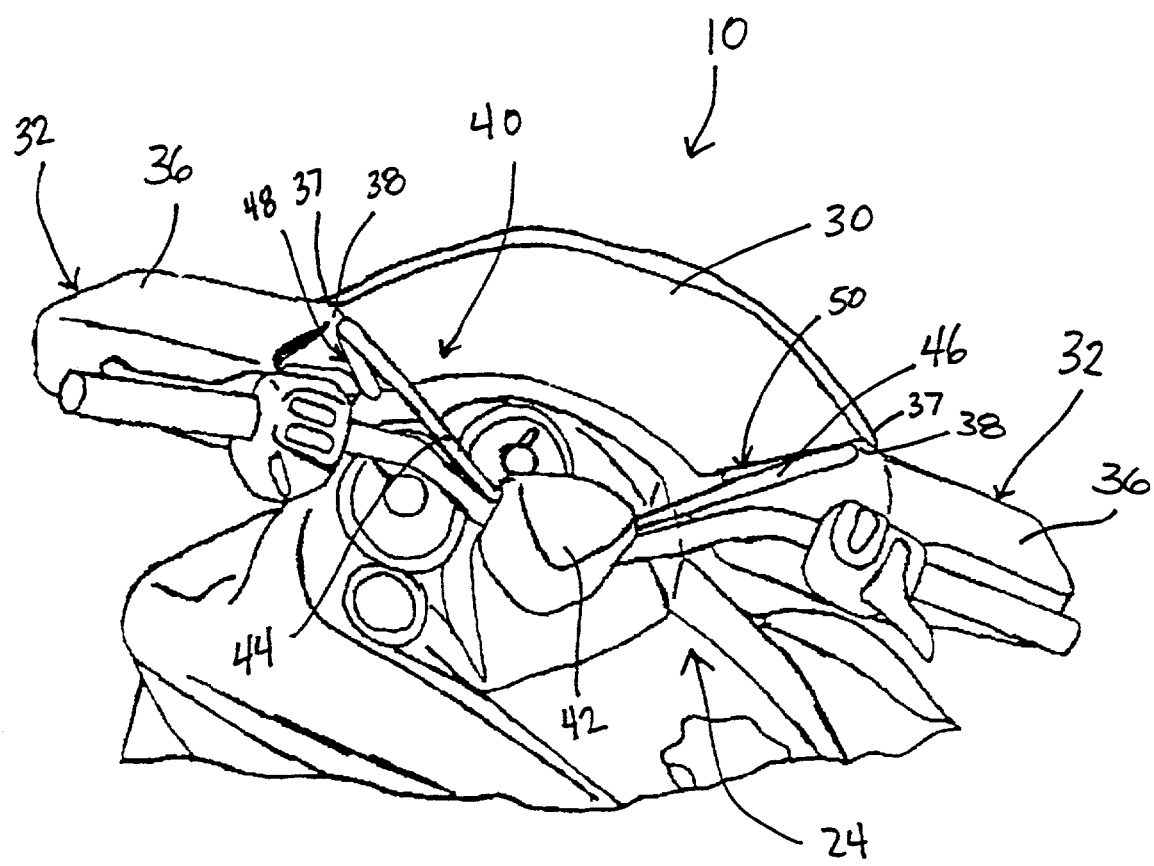
FIG. 3 is a view similar to FIG. 2 showing the detachable windshield assembly mounted to the steering mechanism and turned therewith, but with the cover member shown in solid lines.

As shown in FIGS. 1–3, the detachable windshield assembly 10 is mounted in wind blocking relation with respect to the driver (and optional passenger), generally forwardly of the driver seated on the seat portion 28 of the snowmobile 12. The detachable windshield assembly 10 includes a curved windshield or window panel 30. The windshield 30 preferably is mounted with respect to the steering mechanism 24 (best seen in FIGS. 2 and 3) so that the windshield 30 follows (or rotates with) any movement of the steering mechanism 24.

It may be preferable to construct the windshield 30 from a plastic or Plexiglas® material (e.g., transparent acrylic), however, any other clear, transparent material being sufficiently yieldable or resilient may be used. Also, those skilled in the art would understand that the windshield 30 can be a clear, see-through structure (i.e., transparent), a tinted see-through structure, a translucent structure, or, alternatively, an opaque structure.

As illustrated in FIGS. 1–4, in this first embodiment, the windshield 30 is disposed in overlapping adjacent relation with respect to a handguard assembly 32. The handguard assembly 32 includes a central portion 34 and a pair of hand protecting members 36 integrally extending from opposite sides of the central portion 34. The handguard assembly 32 may be, for example, constructed from any rigid and flexible material, such as, for example, plastic. As with the windshield 30, it is preferred that the handguard assembly 32 be resilient (or yieldable) to resist breaking if struck by an object (or similar force).

The pair of hand protecting members 36 may be spaced from the steering mechanism 24. That way, when a driver's hands are positioned on the steering mechanism 24, the hand protecting members 36 are disposed in wind blocking relation with respect to the driver's hands. As illustrated, this means that the hand protecting members 36 are disposed forwardly of the driver seated on the seated portion 28 of the snowmobile 12. The pair of hand protecting members 36 may also protect the driver's hands from debris (or objects, such as tree branches) while driving the snowmobile 12.

In the exemplary embodiment, the windshield 30 has a marginal portion 37 that overlies an edge portion 38 of each handguard protective member 36 and the central portion 34. However, it is contemplated within the principles of the present invention that the windshield 30 may be configured to extend between the edge portions 38 of the respective hand protecting members 36 (FIG. 7) or may be configured to cover at least a portion (or perhaps the entirety) of the hand protecting members 36.

FIGS. 2 and 3 illustrate the windshield 30 detachably mounted to a frame assembly 40. The frame assembly 40 includes a cover member 42, shown in phantom in FIG. 2 and in solid lines in FIG. 3, to better illustrate mounting clamps 43. The mounting clamps 43, for example, U-shaped metal members, are configured to clamp and hold a pair of mounting members 44, 46 to the steering mechanism 24.

The mounting members 44, 46 extend away from the mounting clamps 43 at diverging angles with respect to one another. While it is preferable to form the mounting members 44, 46 from a one-piece construction, the mounting members 44, 46 may be fixed together (i.e., bolted) or otherwise fixedly attached directly to the steering mechanism 24 or the mounting clamps 43. Fasteners, such as, for example, screws, nails, bolts, adhesive bonding, welding or some other fastening means (or combination thereof), may extend through the mounting clamps 43 and the mounting members 44, 46 to secure the steering mechanism 24, the mounting clamps 43 and the mounting members 44, 46 to the snowmobile 12.

As illustrated in FIG. 3, the cover member 42 is disposed in covering relation to the mounting clamps 43. Although not necessary, the covering member 42 is provided for enhanced cosmetic appeal.

Figure 4:
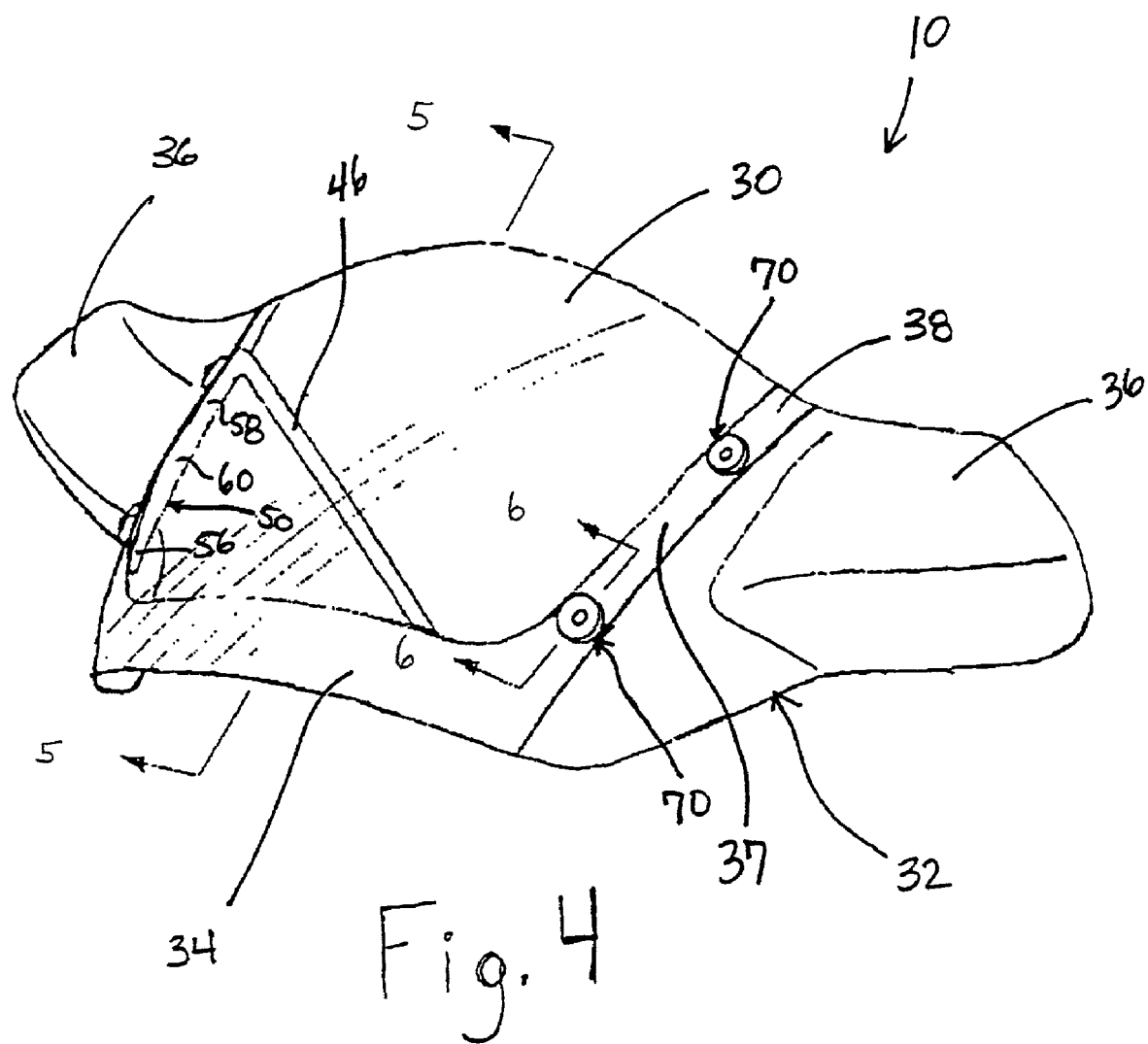
FIG. 4 is a perspective view of the first exemplary embodiment of the detachable windshield assembly constructed according to the principles of the present invention.
Figure 5:
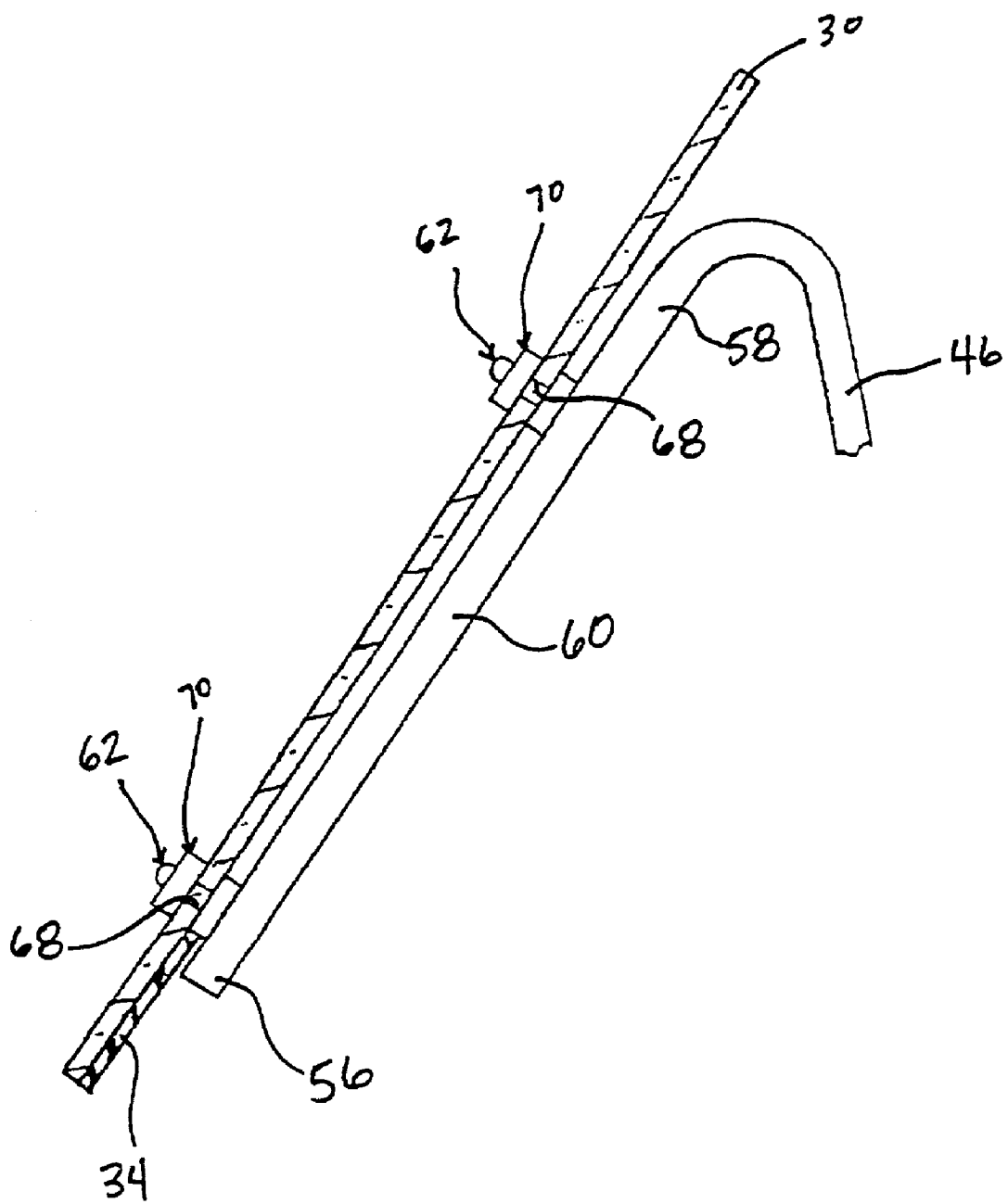
FIG. 5 is a partial cross-sectional view taken along the line 5—5 in FIG. 4, showing the detachable windshield assembly in greater detail.

As shown in FIGS. 2–4, a pair of elongated, laterally spaced windshield support members 48, 50 extend from opposite ends 52, 54 of the mounting members 44, 46, respectively, opposite the mounting bracket and cover member 42. As shown in FIGS. 4 and 5, each support member 48, 50 has a free end portion 56 and a connecting portion 58 that define a relatively straight length therebetween. Beyond the connecting portions 58 each support member 48, 50 is bent to form the mounting members 44, 46, respectively. Also, the support members 48, 50 are disposed on the snowmobile in converging relation with respect to one another. A marginal portion 60, shown in FIG. 5, is disposed between each free end portion 56 and each connecting portion 58 of the support members 48, 50.

Each connecting portion 58 may be integrally formed with the mounting members 44, 46 or may be bonded thereto, such as, for example, by an adhesive, a weld, or some type of fastener.

In the exemplary embodiment, the support members 48, 50 and mounting members 44, 46 have a hollow transverse cross section, which is substantially cylindrical in form, so as to provide sufficient strength and support to the frame assembly 40 of the windshield panel assembly 10. Alternatively, the support members 48, 50 or the mounting members 44, 46 may have a solid cross section and may be constructed into any shape or configuration that provides sufficient strength and support for the frame assembly 40.

Figure 6:
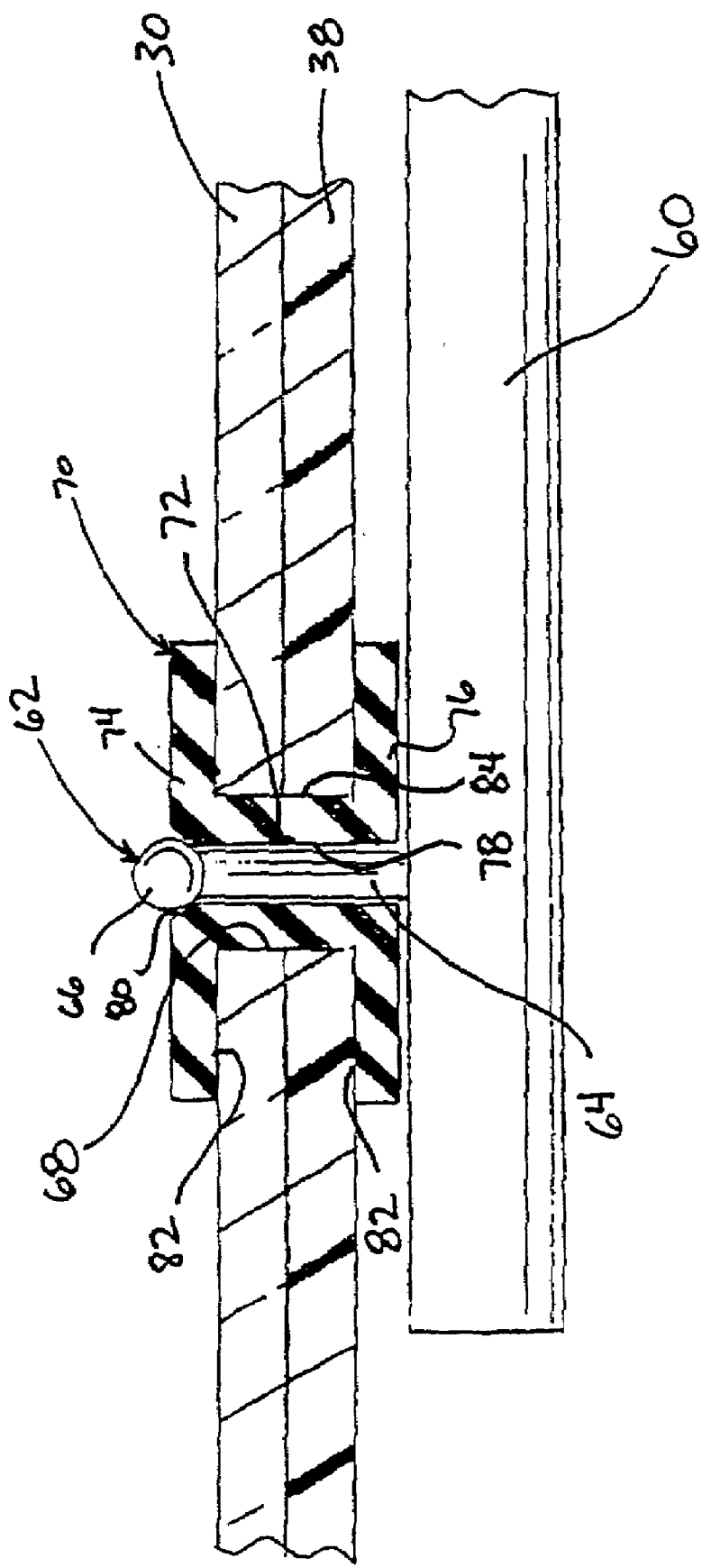
FIG. 6 is a cross-sectional view taken along the line 6—6 in FIG. 4, showing the relationship between the windshield locking structure and the releasable securing structure in the operative position thereof.

The structural detail of the detachable windshield assembly 10 and the manner in which it is mounted on the snowmobile 12 is shown in FIGS. 4–6.

FIGS. 4–6 illustrate a locking member or releasable securing structure 62, designed for the present invention, that permits easy mounting, detachability and a secure connection between the windshield 30 and the support members 48, 50. Each securing structure or locking member 62 projects outwardly from the straight portion of the marginal portion 60 of each support member 48, 50, respectively. Each locking member 62 may be integrally formed with the marginal portions 60 or may be bonded thereto by, for example, adhesive, welding or some other bonding agent, device or fastener.

As illustrated in FIG. 6, each locking member 62 includes a cylindrical shaft 64 and an enlarged protuberance 66 provided at one end of the cylindrical shaft 64. The enlarged protuberance 66 is preferably integrally formed with the cylindrical shaft 64, i.e., as an enlarged end of the shaft 64, but it may be a separate element that is bonded thereto, such as, for example, by an adhesive or welding. Alternatively, the protuberance 66 may be affixed to the shaft 64 by a screw or other suitable attachment device.

As shown, the enlarged protuberances 66 preferably have spherical configurations, however, any enlarged configuration (i.e., toroidal, oval, elliptical, etc.) may be implemented in accordance with the principles of the present invention.

In the exemplary embodiment, the marginal portion of the windshield 30 and the edge portions 38 define a plurality of apertures 68. When the windshield 30 is mounted to the support members 48, 50, such that the marginal portion thereof overlies the edge portions 38, one aperture 68 corresponds with and is positioned in opposing relation to one of the locking members 62. Each aperture 68 may have a circular configuration, preferably to retain a grommet 70 therein.

As illustrated in FIGS. 4–6, each grommet 70 includes a central body portion 72 integrally formed with an outer flange portion 74 and an inner flange portion 76 extending from opposite sides thereof. A centrally disposed opening 78 extends longitudinally through the central body portion 72 in which a locking member 62 is received. The central body portion 72 may have an annular or tubular configuration that defines the centrally disposed locking member receiving opening 78, but other shapes, such as squares or ovals, may be used as well. The locking member receiving openings 78 preferably have a substantially equal circumference in the longitudinal direction thereof and are configured to receive the locking members 62 therethrough in tight, inter-fitting, and engaging relation therewith.

Each grommet 70 may be made from a resilient material, including rubber, a thermoplastic material, an elastomeric material, a soft metal, or any other material (or any combination thereof) having a sufficient elasticity and resiliency. It may be preferable for the grommet 70 to be constructed from a material which permits the locking members 62 to be snap fit into the locking member receiving openings 78. In this embodiment, the grommet 70 is constructed from a synthetic rubber material having a durometer measurement within the range of 60 to 85, with a range of 70 to 75 being most preferable.

The outer flange portion 74 may have an annular configuration (as illustrated in FIG. 6) that defines a locking member engaging recess 80. The locking member engaging recess 80 forms an annular depression in the exterior surface of the outer flange portion 74. The recess 80 engages the protuberance 66, as illustrated.

The inner flange portion 76 may have an annular configuration (as illustrated in FIG. 6), which is similar to the outer flange portion 74 with the exception of not having the lock member engaging recess 80 formed in an exterior marginal portion thereof. Of course, the recess 80 may be provided in the inner flange portion 76 so that the grommet 70 is symmetrical and may be more easily installed in the aperture 68. The outer and inner flange portions 74, 76 are spaced apart from one another by the central body portion 72. The outer and inner flange portions 74, 76 define oppositely facing windshield retaining surfaces 82 on the interior surfaces thereof and the exterior surface of the central body portion 72 defines a windshield abutting surface 84.

FIG. 6 illustrates the retaining surfaces 82 and the abutting surface 84 that cooperate to enclose and hold the windshield 30 when the grommets 70 are positioned within the apertures 68. Particularly, the central body portion 72 of each grommet 70 is disposed within each aperture 68 such that the abutting surface 84 thereof abuts the edge of the windshield 30. The retaining surfaces 82 engage the oppositely facing exterior surfaces of the windshield 30 to retain the central body portion 72 within the aperture 68 by precluding axial movement of the central body portion 72 within the aperture 68.

The abutting surface 84 spaces the retaining surfaces 82 from one another to define the windshield abutting portion of the grommet 70. It may be preferable for the retaining surfaces 82 and the abutting surface 84 to be constructed of equal or similar thickness as the windshield 30 so that each grommet 70 may be sealingly secured within each aperture 68.

Figure 7:
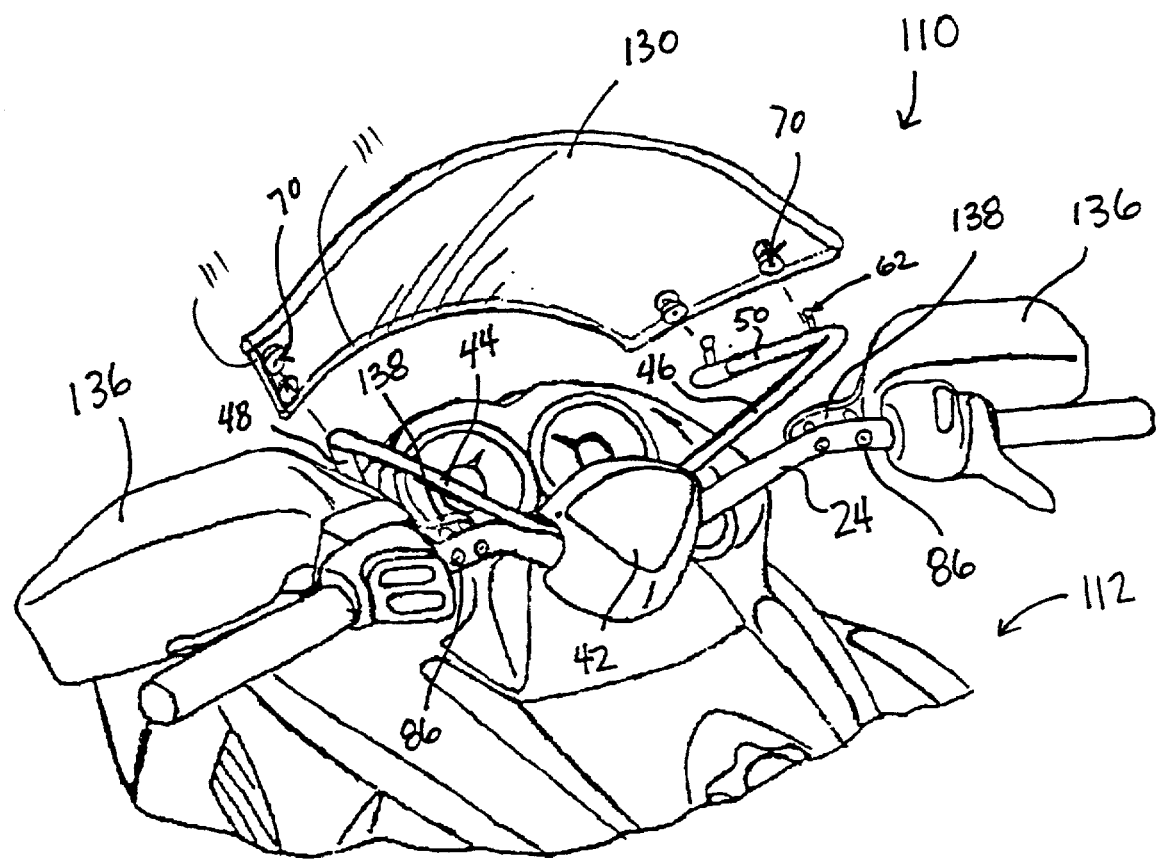
FIG. 7 is a view similar to FIG. 2 showing a second exemplary embodiment of the detachable windshield assembly of the present invention, which, in this drawing, is shown detached from the snowmobile.

Another exemplary embodiment of the invention is illustrated in FIG. 7 which shows a detachable windshield assembly, generally designated 110, detached from the frame assembly 40 of a snowmobile 112 (shown in fragmentary view). The snowmobile 112 may be of the same construction as snowmobile 12 except for the detachable windshield assembly 110 and separate handguard members 136, which may attach to each handlebar of the steering mechanism 24. Structures on the snowmobile 112 that are identical to structures on the snowmobile 12 are given identical reference numerals and are not commented upon further.

The detachable windshield assembly 110 includes a windshield 130 in generally overlying relation to the hood structure (not shown). The windshield 130 may be a curved, clear see-through structure, a tinted see-through structure, a translucent structure, or an opaque structure, preferably having the same construction as the windshield 30 described above. The windshield 130 is detachably mounted to the steering mechanism 24 via the frame assembly 40.

As illustrated, fasteners 86 attach a narrowed end portion 138 of each hand protecting member 136 to a respective handlebar of the steering mechanism 24. The hand protecting members 136 are preferably mounted (similarly to the hand protecting members 36) in wind blocking relation with respect to the hands of the driver, generally forwardly of the driver seated on the seated portion 28 of the snowmobile 12.

It can be appreciated from FIG. 7 that the structure of the detachable windshield assembly 110 is similar to the structure of the detachable windshield assembly 10 but that the detachable windshield assembly 110 is constructed to be separate and independent from the handguard members 136. As a result, the detachable windshield assembly 110 may be installed as an aftermarket product on conventional snowmobiles.

It may be preferable for the windshield assembly 110 to further include a sealing element 111, for example, an elastomeric material, which might be adapted to tightly seal the area or space between the windshield assembly 110 and the hood structure 18 of the snowmobile 12.

Figure 8:
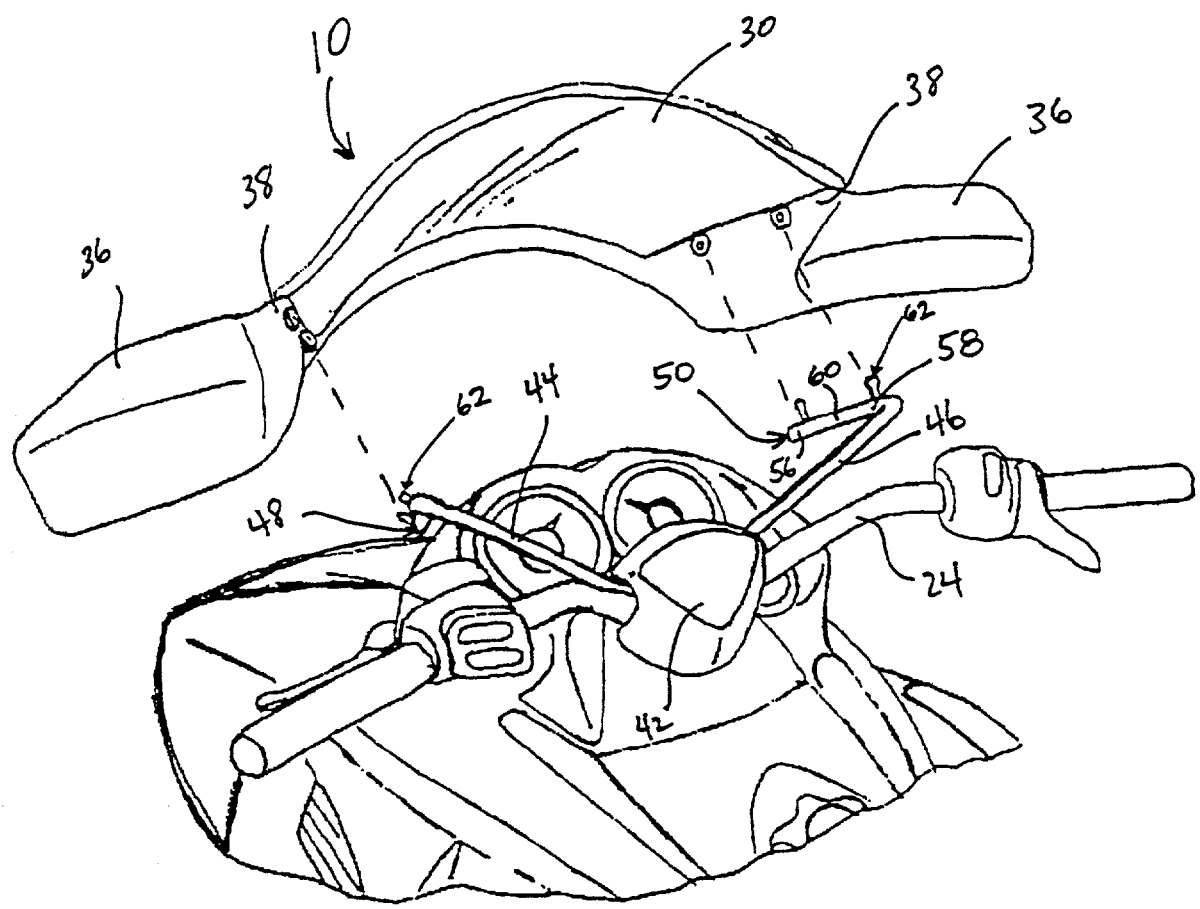
FIG. 8 is a view similar to FIG. 7 showing the first exemplary embodiment of the detachable windshield assembly of the present invention, shown detached from the snowmobile.

For illustrative purposes, in FIG. 8, the windshield assembly 10 is shown detached from the frame 40.

Figure 11:
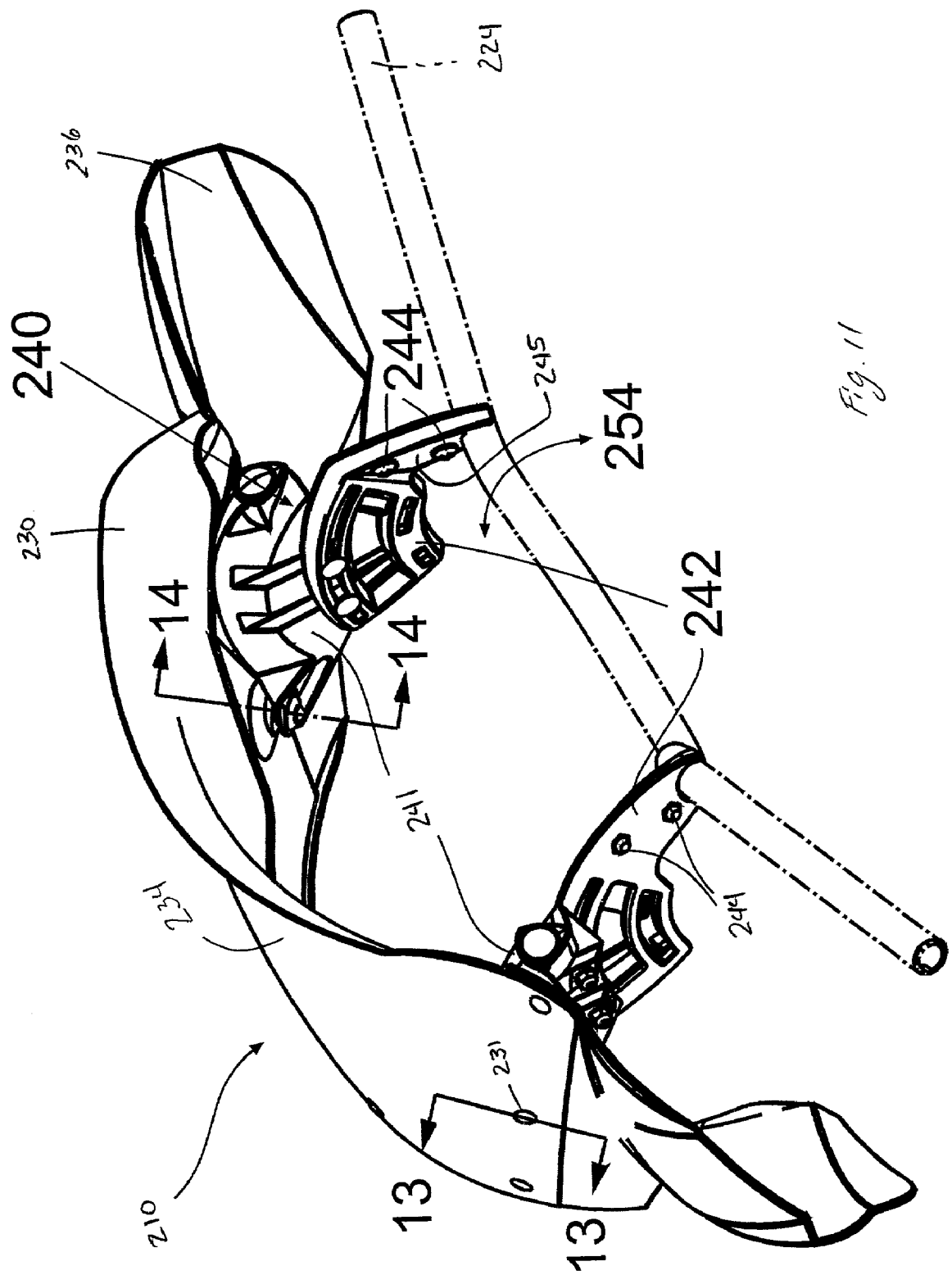
FIG. 11 is a view similar to FIG. 2 showing a third exemplary embodiment of the detachable windshield assembly of the present invention.
Figure 12:
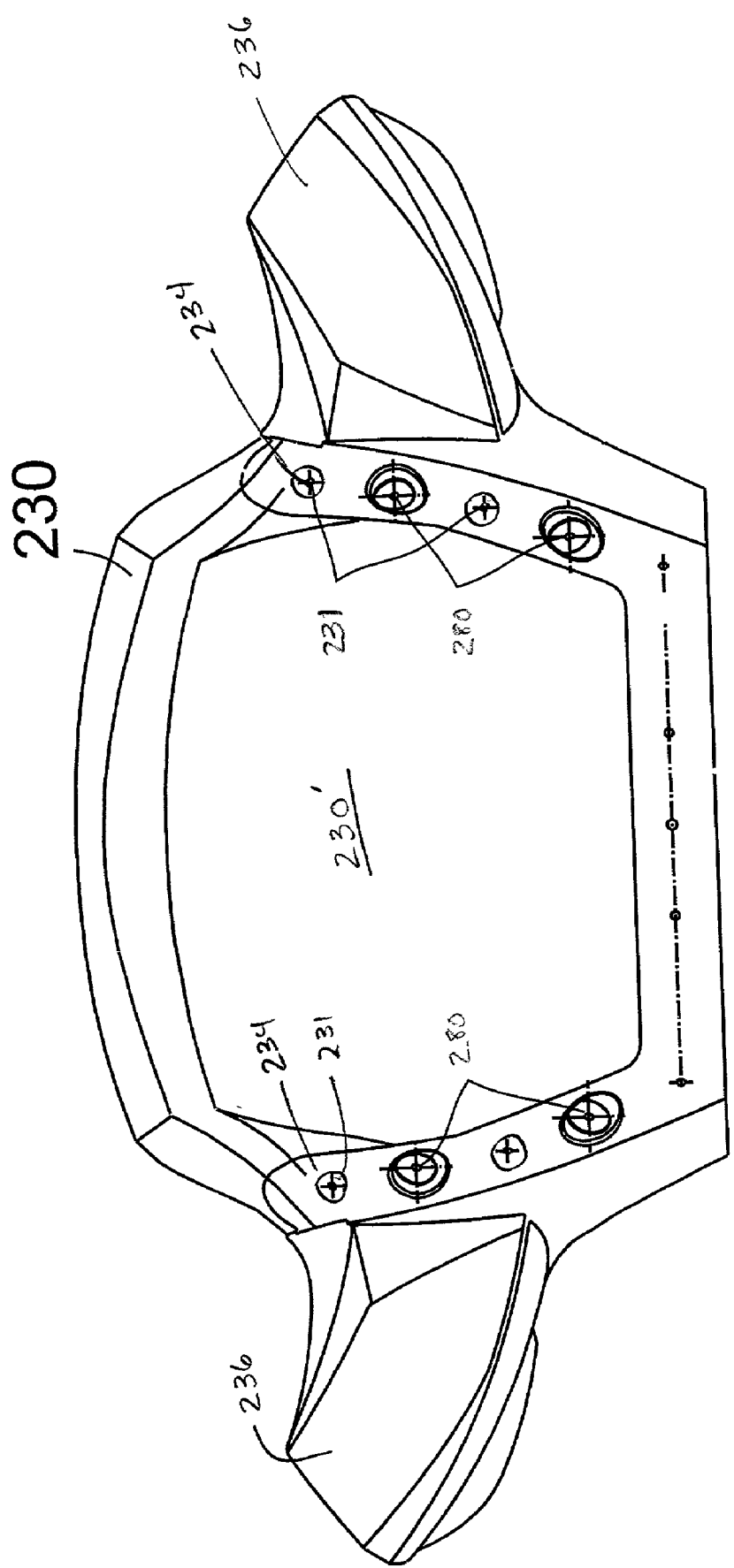
FIG. 12 is a front view of the detachable windshield assembly of the third exemplary embodiment.
Figure 13:
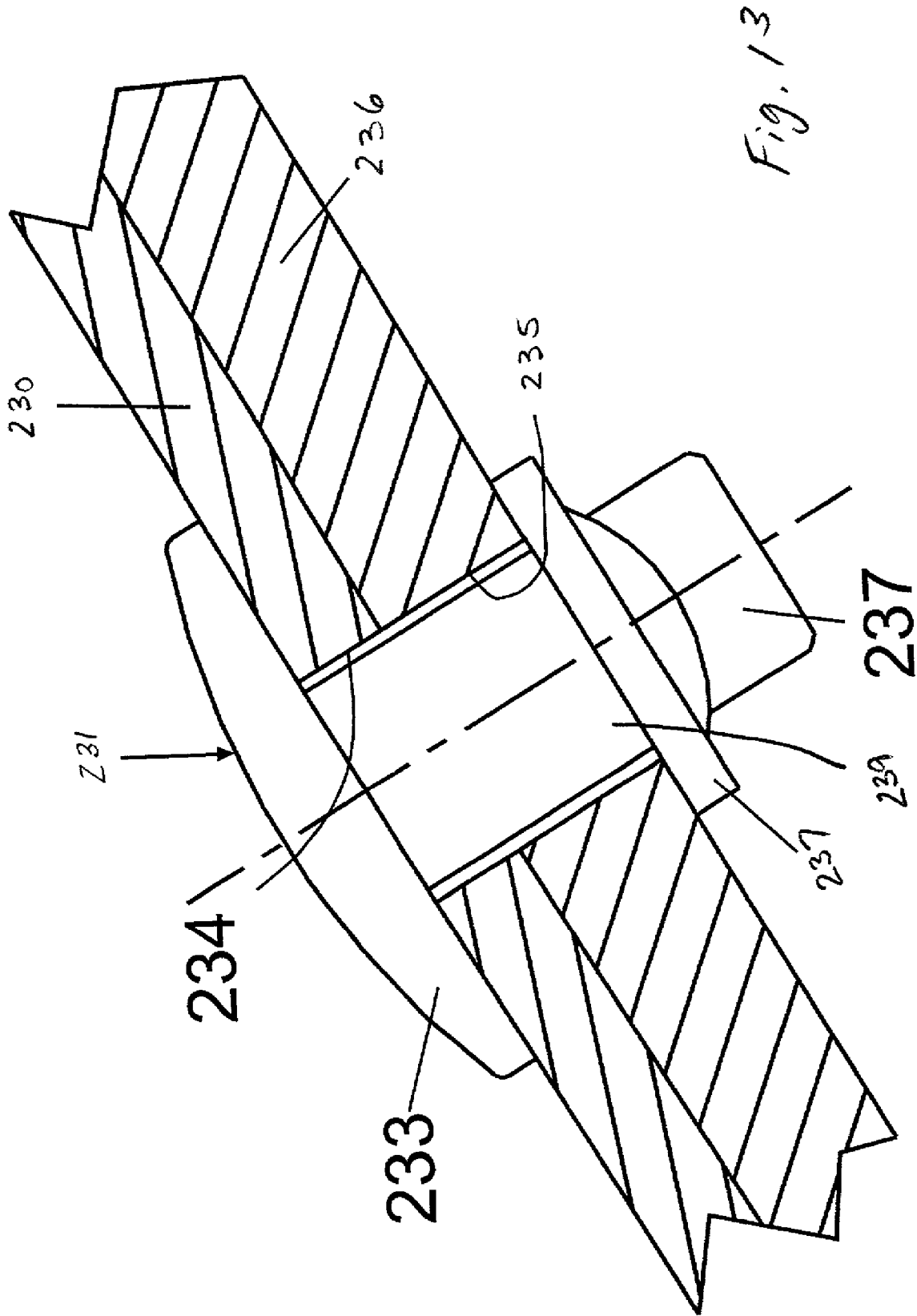
FIG. 13 is a partial cross-sectional view taken along line 13—13 in FIG. 11.

A third exemplary embodiment of the present invention is illustrated in FIG. 11. Detachable windshield assembly 210 includes a windshield portion 230 and a hand guard members 236 similar to detachable windshield assembly 10. In this embodiment, as shown in FIG. 12, the windshield 230 is fastened to the hand guard members 236 by one or more fasteners 231. The fastener 231, which is illustrated in FIG. 13, has a mushroom-shaped head portion 233 connected to a shaft 239 that passes through holes 234 and 235 in the windshield 230 and the hand guards 236, respectively. A locking member 237, which is disposed at the opposite end of the shaft 239 from the head portion 233, prevents fastener 231 from disengaging from the holes 234 and 235.

In the preferred embodiment, fastener 231 includes an elongated cylindrical shaft 239 that extends through holes 234 and 235. Locking member 237 has an X-shaped appearance (not shown), which receives and holds cylindrical shaft 239 and locking member 237 together. As would be recognized by one skilled in the art, shaft 239 and locking member 237 could be threadedly machined to hold the windshield 230 and the hand guard member 236 together.

The structural details of the detachable windshield assembly 210 and the manner in which it is mounted onto snowmobile 12 are shown in FIGS. 11–18.

Detachable windshield assembly 210 comprises a support frame 240 mounted to a snowmobile (not shown in FIGS. 11–18) via windshield supports 241 and support plates 242. The windshield supports 241 and the support plates 242 are preferably made from a plastic material, but as would be known by one skilled in the art, any material having suitable rigidity (and flexibility) could be used. The support plates 242 are connected to the steering mechanism 224 by fasteners 244 such as screws or bolts. Extending radially from, and welded to the steering mechanism 224 is a plate 245 fitted to receive the fasteners 244 and serve as a support between the support plates 242 and the steering mechanism 224.

Figure 16B:
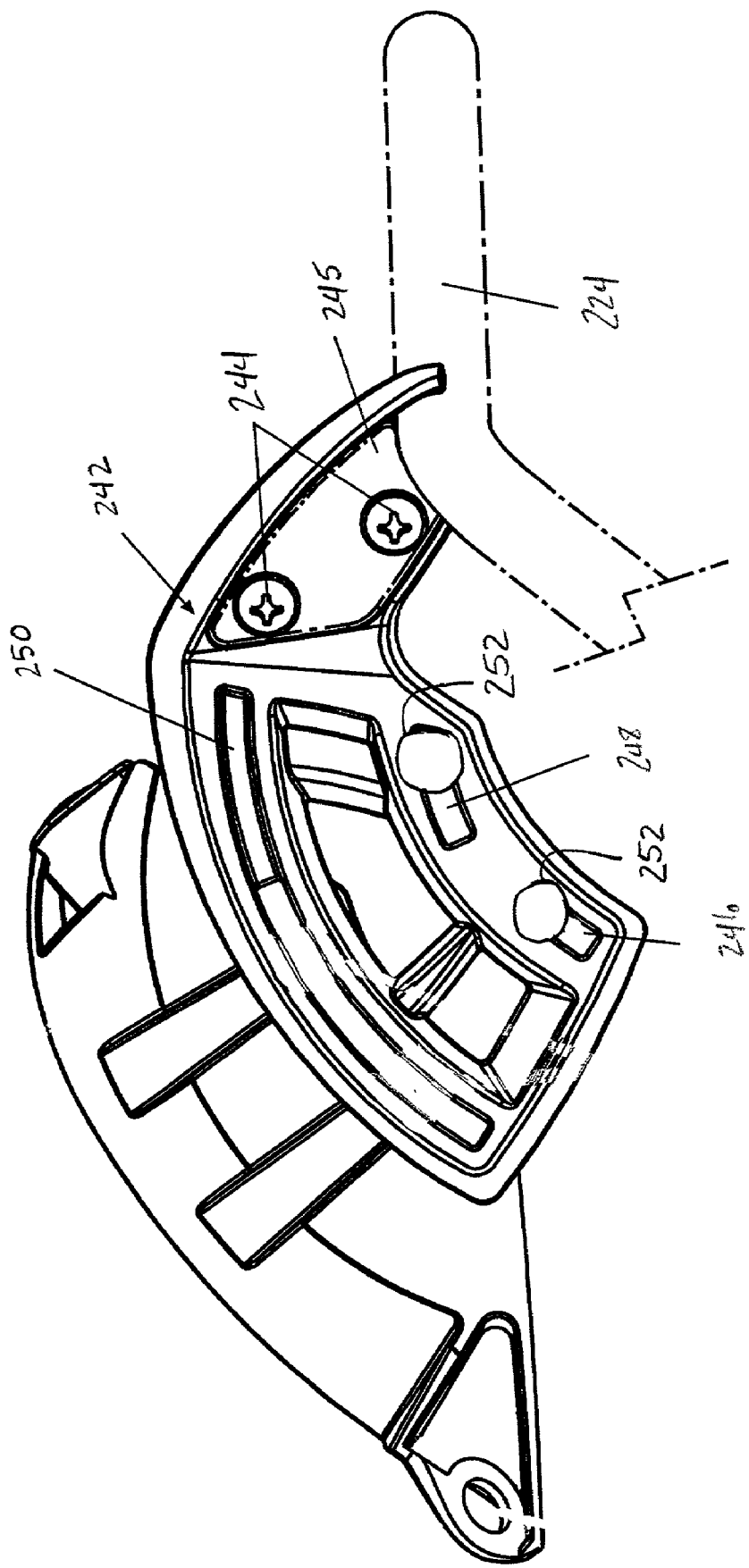
FIG. 16(b) is a perspective view of a second position of the attachment links between the steering mechanism and the detachable windshield assembly shown in FIG. 16(a)

As illustrated in FIG. 17, the support plate 242 includes slots 246, 248 and 250. Slots 246, 248, 250 receive one or more adjustment bolts 252, which are shown in FIGS. 16(*a*) and 16(*b*). Slots 246, 248, 250 allow the windshield support 241 to be adjustable with respect to the support plate 242. In operation, the detachable windshield 210 may be placed in a high position where the slot 250 receives both adjustment bolts 252, such as that shown in FIG. 16(*a*). Alternatively, the detachable windshield 210 may be placed in a low position where slots 246, 248 each receive one of the attachment bolts 252, as shown in FIG. 16(*b*). Slots 246, 248, 250 allow the steering mechanism to be tilted forward in the direction indicated by the arrow 254 shown in FIG. 11, preventing contact between the central portion 230' of the detachable windshield 210 and the ledge assembly (which is designated as 22 in FIG. 1).

Figure 18:
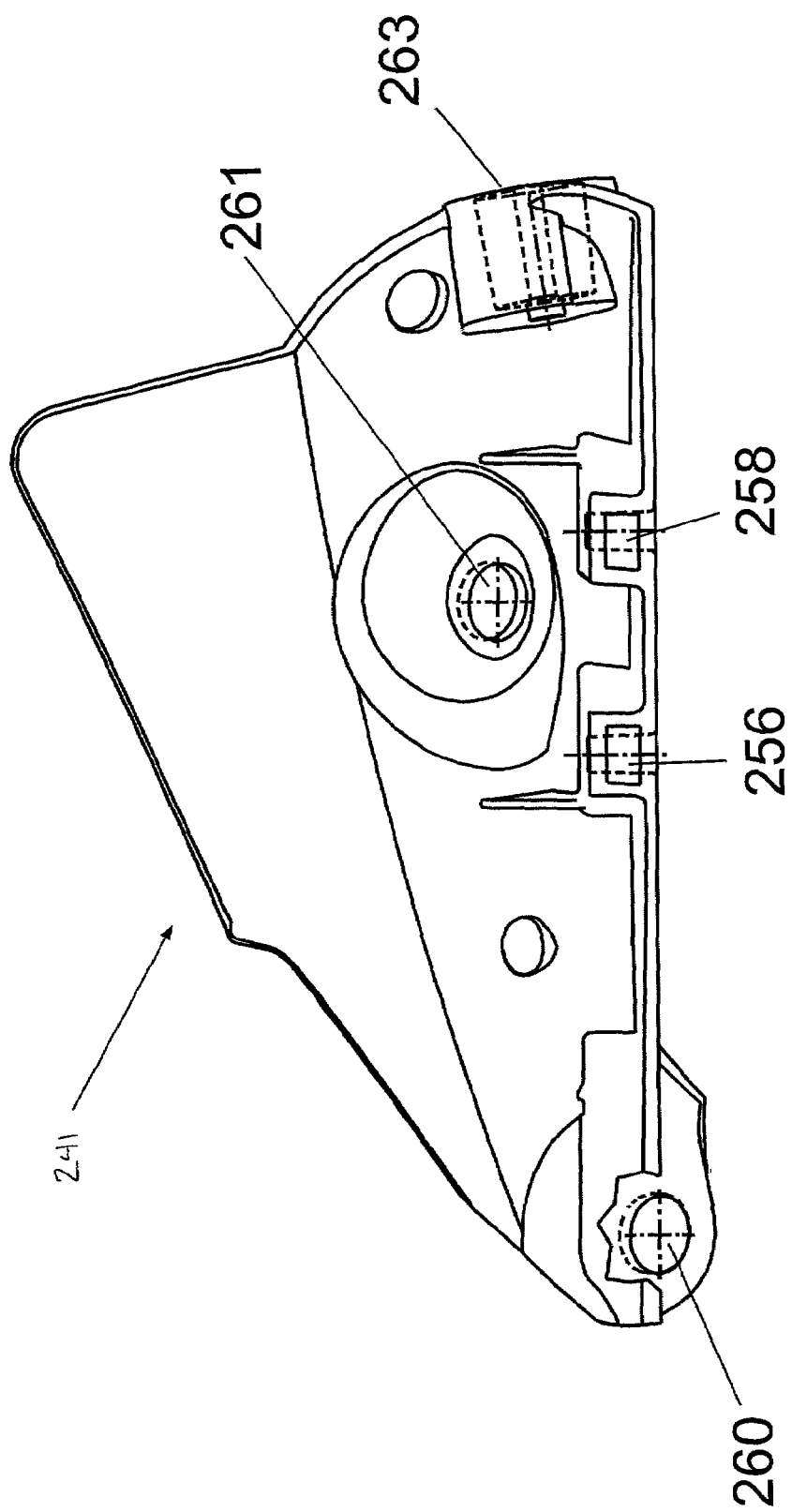
FIG. 18 is an exploded view of the windshield support shown in FIG. 16.
Figure 19:
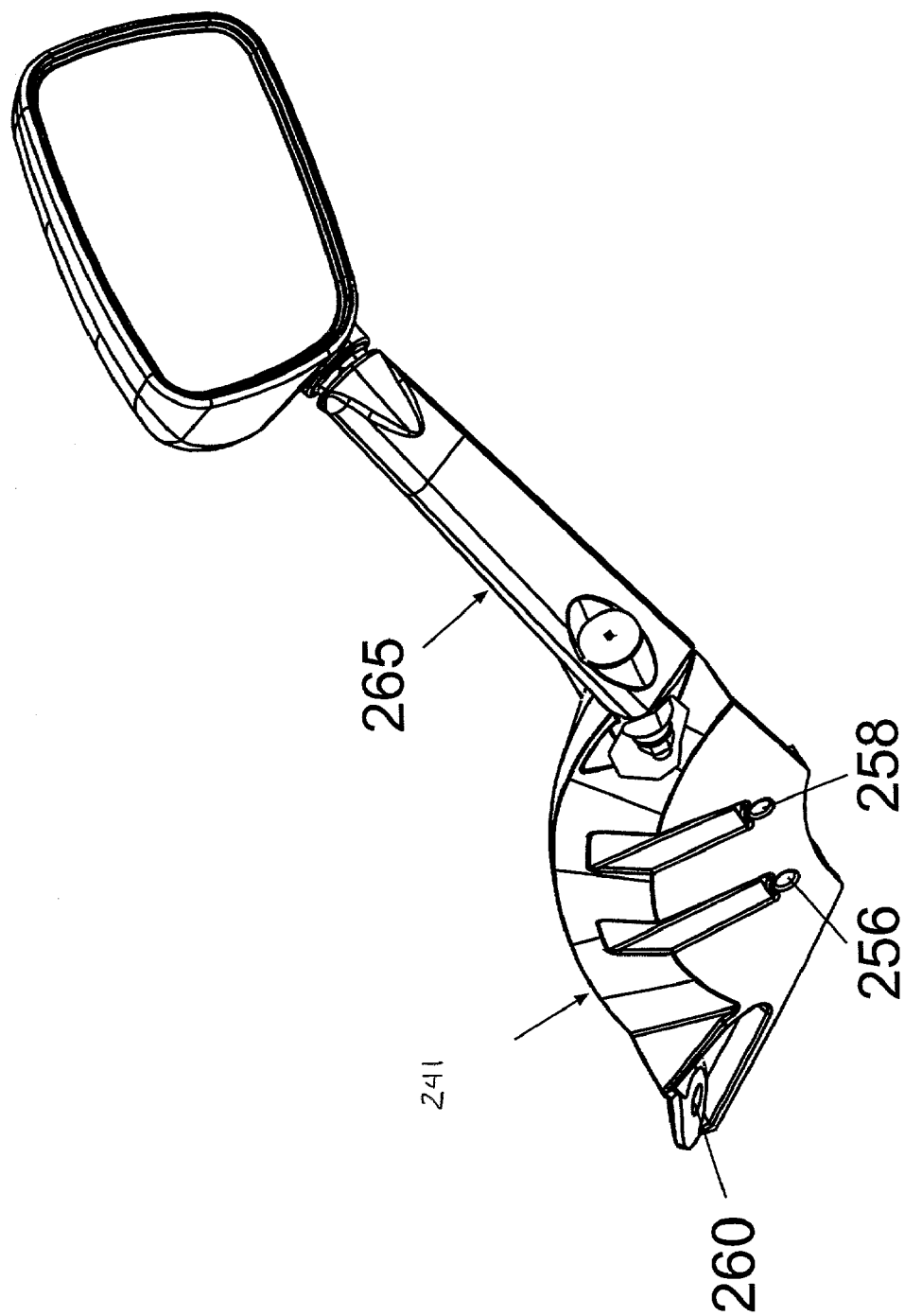
FIG. 19 shows the windshield support of FIG. 18, provided with a mirror in this embodiment.

As illustrated in FIG. 18, the windshield support 241 includes two apertures 256 and 258. The apertures 256 and 258 receive adjustment bolts 252 for positioning the windshield support 241 as described above. As shown in FIG. 18, the windshield support 241 also includes two grommet holes 260 and 261. The grommet holes 260 and 261 both receive a grommet 270, such as the one shown in FIG. 14(a). Also shown in FIGS. 18 and 19, the windshield support 241 further includes a holding portion 263 to which a mirror 265 may be mounted.

FIG. 14 illustrates one embodiment of the locking structure between the windshield support 241 and the detachable windshield 210. As illustrated, each grommet 270 is similar in construction to grommet 70 shown in FIG. 6. Grommet 270, shown enlarged in FIG. 14(a), includes a central body portion 272 integrally formed with an outer flange portion 274 and an inner flange portion 276 extending from opposite sides thereof. A centrally disposed opening 278 extends longitudinally through the central body portion 272 in which a cylindrical shaft 264 of locking member 262 is received.

Figure 14C:
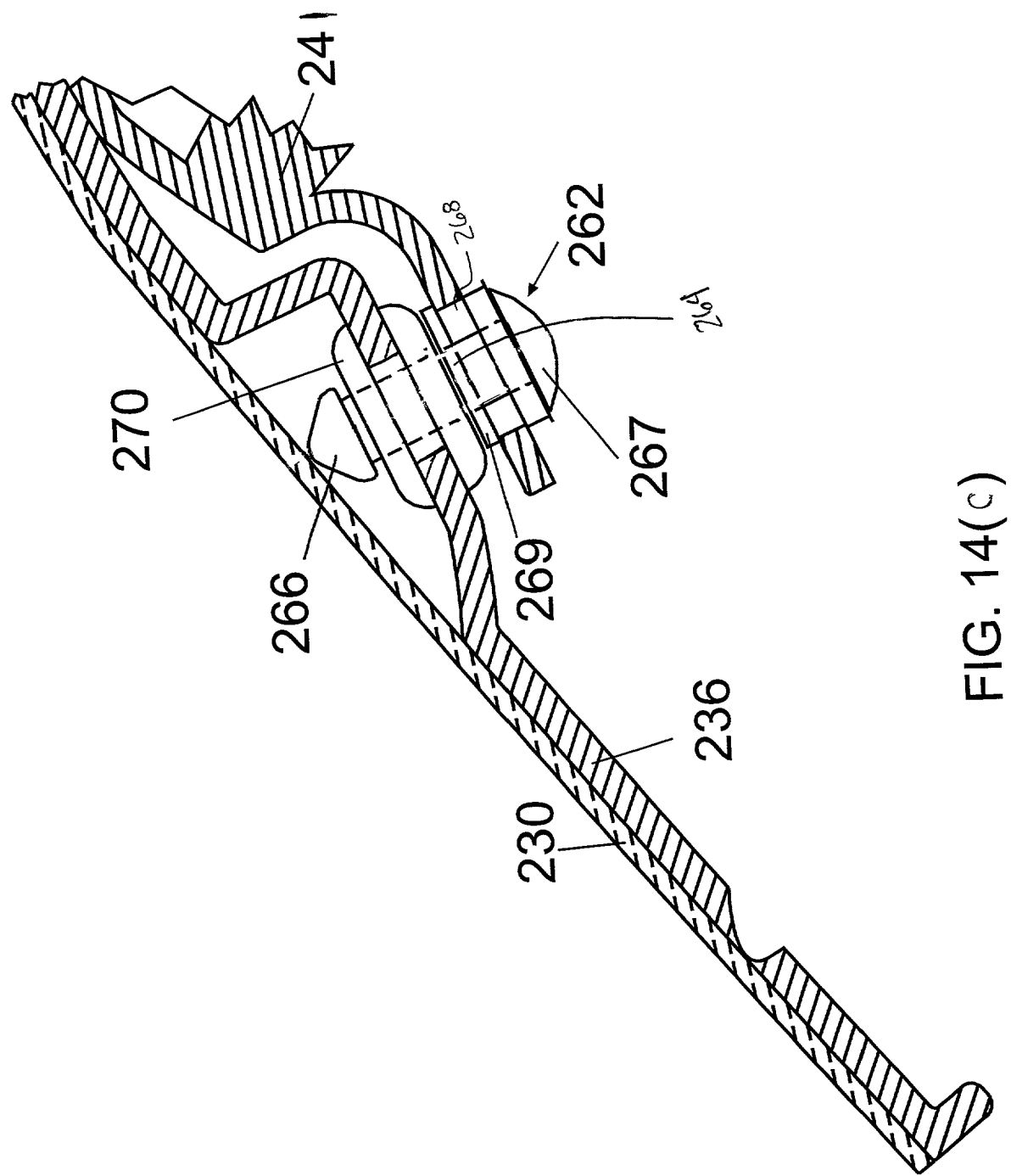
FIG. 14(c) is an exemplary embodiment of an alternative locking structure for the detachable windshield.
Figure 15:
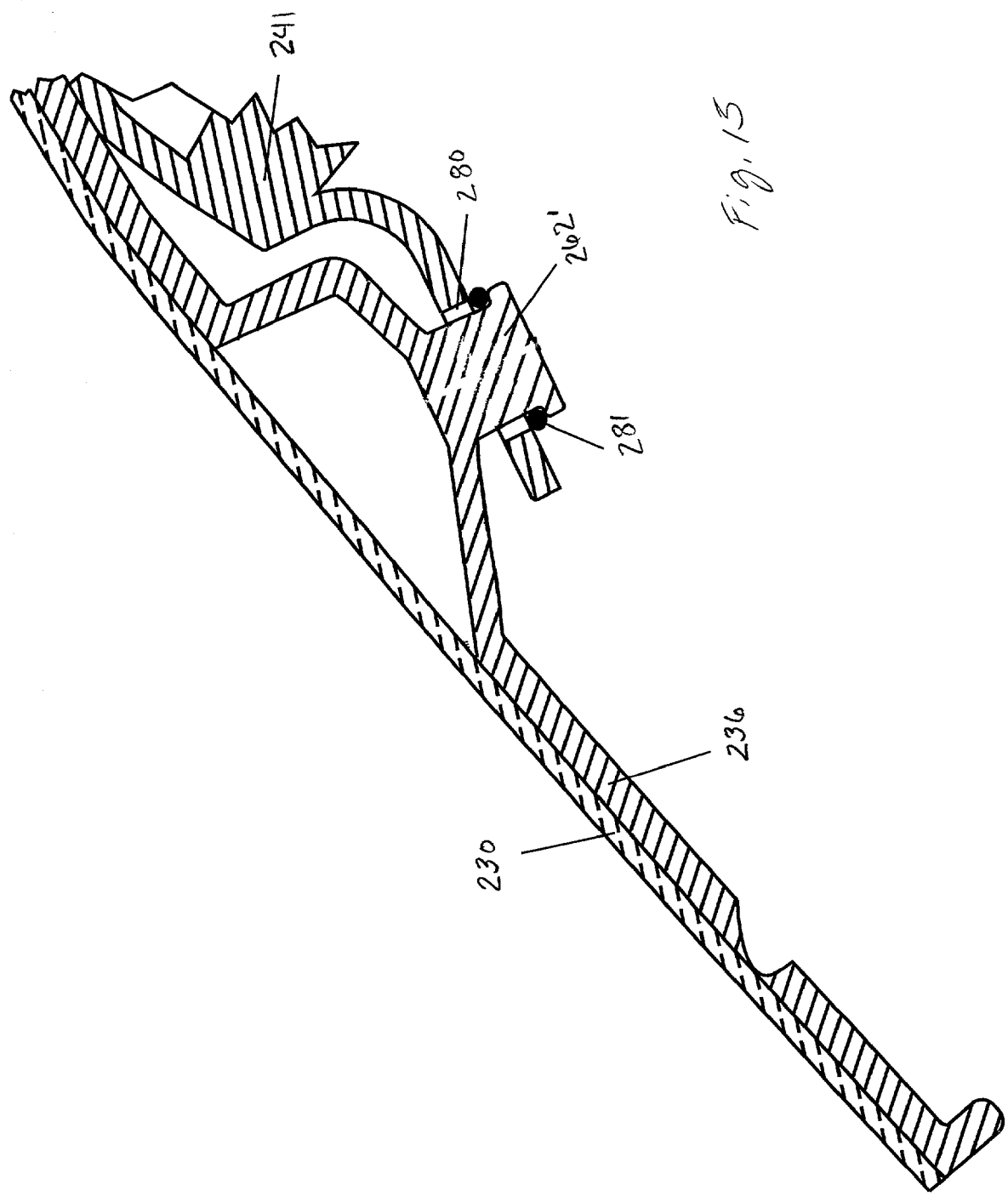
FIG. 15 is yet another exemplary embodiment of the locking structure of the detachable windshield of the present invention.

In the preferred embodiment, locking member 262 is a separate part fastened to hand guard member 236 via aperture 280, as illustrated in FIGS. 14(a) and 14(c). Locking member 262 could also be formed integrally with the hand guard member 236 such as the locking member 262' that is shown in FIG. 15.

Locking member 262, as shown in FIGS. 14(a) and 14(c), includes a cylindrical shaft 264 having an enlarged protuberance 266 provided at one end of cylindrical shaft 264. An end cap 267 is situated at the opposite end of shaft 264. The end cap 267 along with the fastening element 269 holds the locking member 262 in place with the hand guard member 236. The fastening element 269 could be for example, a nut, threaded to mate with locking member 262 and sandwich the hand guard member 236 between the end cap 267 and the fastening element 269.

The cylindrical shaft 264 extends beyond the fastening element 269 such that it enters the opening 278 of the grommet 270. The grommet 270 is positioned in the opening 268 of the hand guard member 236 such that the outer flange 274 and inner flange 276 prevent the grommet 270 from being displaced from the hand guard member 236 when the cylindrical shaft 264 is pushed though the opening 278 of the grommet 270.

In the preferred embodiment, the grommet 270 is made of a resilient material, including rubber, a thermoplastic material, an elastomeric material, a soft metal, or any other material having sufficient elasticity and resiliency (or any combination thereof). So constructed, the grommet 270 easily allows passage of the enlarged portion 266 through the opening 278 with a snap fit. The preferred diameter of the opening 278 is sized to match that of the diameter of the cylindrical shaft 264 to prevent movement of the cylindrical shaft 264 with respect to the grommet 270 after installation.

FIG. 15 shows a second embodiment of the locking structure shown in FIGS. 14(a) through 14(c). This embodiment includes a tab 262' integrally formed with the hand guard 236. The tab 262' performs similar functions as the cylindrical shafts 64 and 264 mentioned above. As with the cylindrical shafts 64 and 264, the tab 262' could be rectangular or cylindrical in cross section (or any other suitable shape). As shown in FIG. 15, an elastic member 281 encircles the tab 262' to prevent the tab 262' from being easily displaced through the opening 268 in the hand guard member 236. Unlike the locking structure illustrated and described in connection with FIGS. 14(a) to 14(c), the locking structure shown in FIG. 15 does not necessarily result in a snap fit between the elastic member 281 and the tab 262'. To assemble the locking structure shown in FIG. 15, one pushes the tab 262' through the opening 268 and then proceeds to install the elastic member 281 around the protruded portion of the tab 262'.

As would be recognized by those skilled in the art, the reverse orientation to that shown in FIG. 14(a) may be employed. As shown in FIG. 14(c), the grommet 270 may be installed onto the hand guard member 236 to receive the locking member 262 fixed to the windshield support 241.

The detachable windshield assembly 10, 110 and 210 can be detachably mounted to the snowmobile to provide a user with a desired degree of wind protection and replacement options. The operation and method of installation will now be considered with reference to detachable windshield assembly 10, but the operation and method of installation of the detachable windshield assemblies 110 and 210 are similar.

To install or mount the detachable windshield assembly 10, the user first mounts the windshield support frame 40 to the snowmobile, preferably to the steering mechanism 24 so that the windshield 30 moves and turns together with the steering mechanism 24. Then, the user positions the detachable windshield 10 in spaced apart relation from the windshield support frame 40 such that the apertures 68 are substantially aligned with corresponding locking members 62 (See FIG. 8).

By moving the detachable windshield 30 toward the support frame 40 (i.e., a first direction), the enlarged protuberances 66 of the locking members 62 engage the locking member receiving openings 78 such that the protuberances 66 engage the grommets 70 and move the locking member receiving openings 78 outwardly. This outward movement allows the protuberance 66 to move with a snap action into a mounted position, as shown in FIG. 6, within the receiving recess 80, as the windshield is attached to the support frame 40.

The recesses 80 may be configured to substantially conform to the size and shape of the enlarged protuberance 66 of each locking member 62, but other shapes, such as squares or ovals may be used as well.

An appropriate force, in a direction away from the support frame 40 (i.e., a second direction opposite the first direction), for example, during a snowmobile accident, is required to move the locking member receiving openings 78 over the protuberances 66, such that the locking member receiving openings 78 move outwardly. In this manner, the outward movement allows the protuberance 66 to become detached or disengaged from the locking member receiving opening 78. Thereafter, the locking member receiving opening 78 returns to its normal configuration and the windshield is detached from the support frame 40.

It may be preferable for the detachable windshield assembly 10 to be adapted such that a driver may detach the windshield 30 from the support frame 40 via manual force, i.e., by pulling the windshield 30 away from the snowmobile 12. That way, the driver may repair or replace the windshield 30.

It can be understood that the adjustable windshield assemblies 10 and 110 shown in the figures are exemplary only and not intended to limit the scope of the invention. For example, the apertures 68 may be formed in either the windshield 30 or the edge portions 38 and need not necessarily be formed through both the windshield 30 and the edge portions 38.

One skilled in the art will understand that although the embodiments of the detachable windshield assembly shown and described use a pair of releasable securing structures or locking members 62 extending from each supporting member 48, 50 which are retained in the apertures 68 to sealingly secure the windshield 30 to the frame assembly 40, it is possible to implement only one locking member 62 to operatively secure the windshield 30 to each support member 48, 50. However, in other applications, it may be preferable to implement more than two locking members 62 to operatively secure the windshield 30 to each support member 48, 50, as will be described in greater detail below. In the broadest aspects of the invention, therefore, it is contemplated to provide a detachable windshield assembly mounted to the windshield locking structure by any number of releasable securing structures attached to the windshield.

Figure 9:
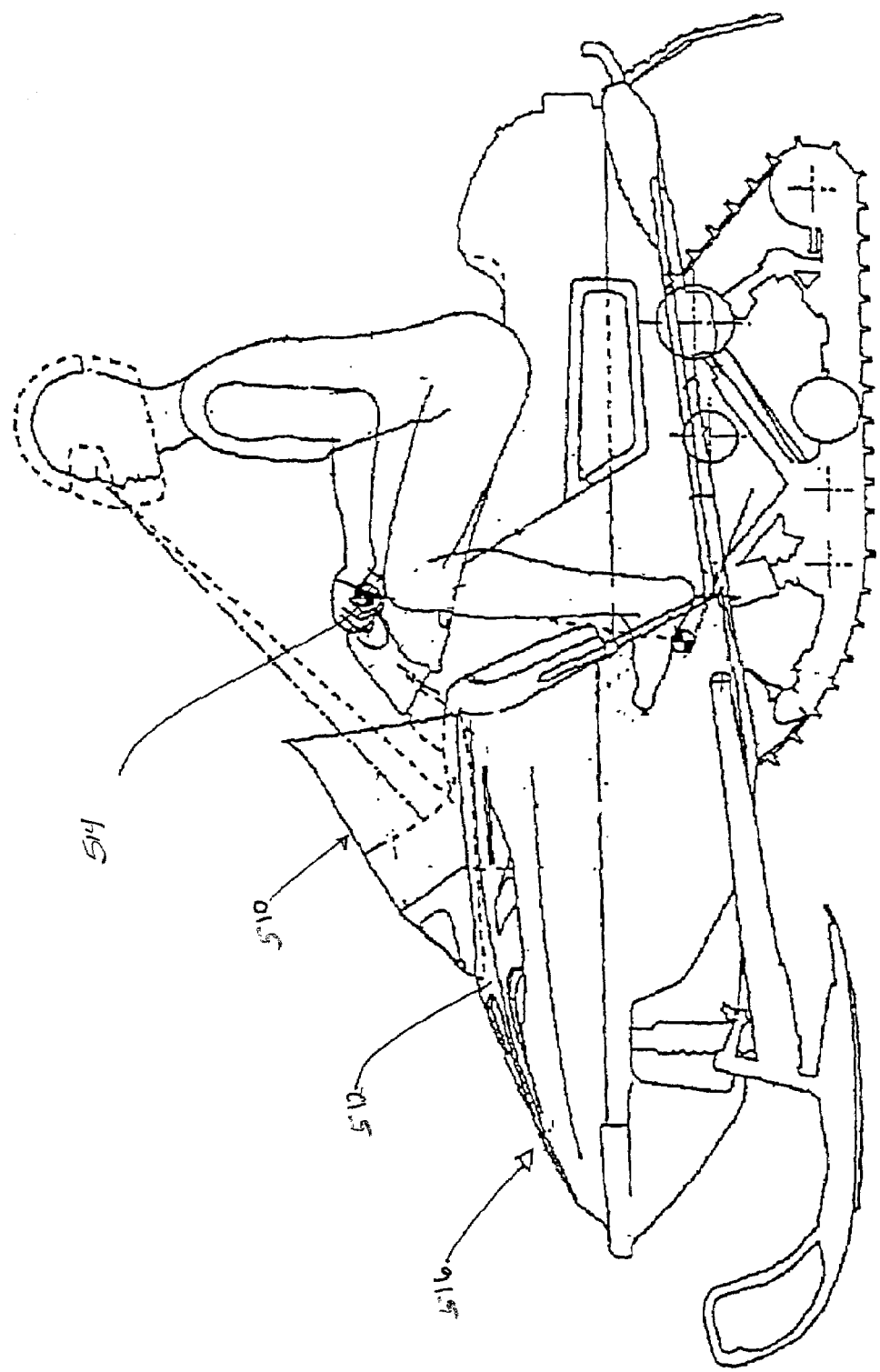
FIG. 9 is a view showing a snowmobile windshield in the prior art where the windshield is mounted fixedly to the portion of the hood that surrounds the handlebar of the steering assembly.
Figure 10:
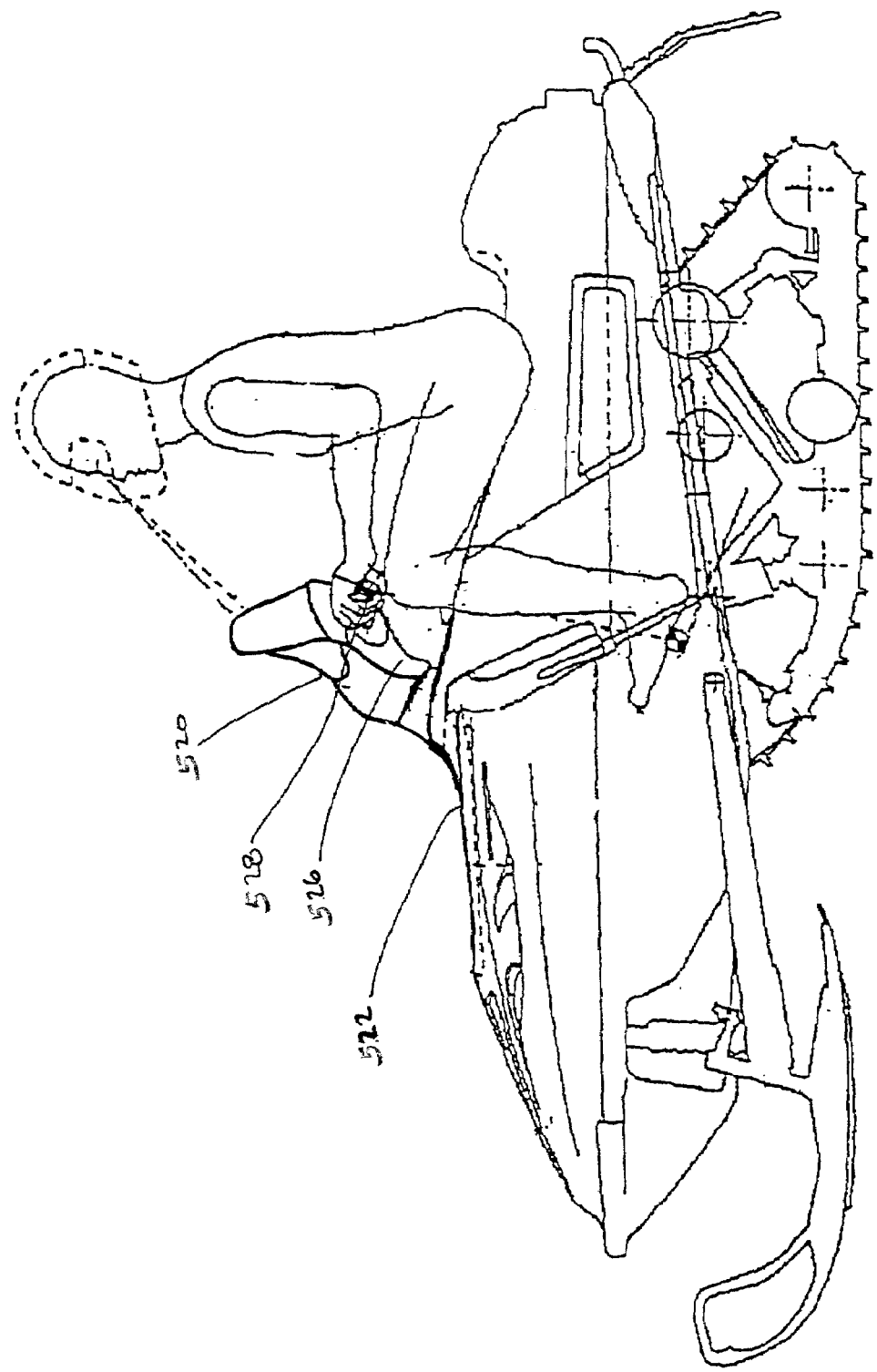
FIG. 10 is a view showing a snowmobile windshield in the prior art where the windshield is fixedly connected to the steering assembly of the snowmobile.

Alternatively, the detachable windshield assemblies 10, 110 may be mounted to a steering mechanism of any snowmobile. For example, either of the detachable windshield assemblies 10, 110 could be mounted to the snowmobiles shown in FIGS. 9 and 10 to replace the windshields 210, 220, respectively.

The principles, embodiments and modes of operation of the present invention have been described in the foregoing specification. However, the invention should not be construed as being limited to a particular embodiment or the embodiments, which have been described above. Instead, the embodiments described here should be regarded as illustrative rather than restrictive. Variations and changes may be made by others without departing from the scope of the present invention.

What is claimed is:

1. A snowmobile comprising:
a chassis;
a motor disposed on the chassis;
a ground engaging endless track disposed below the chassis and operatively connected to the motor;
at least one ski disposed on the chassis;
a steering mechanism operatively connected to the at least one ski;
a support frame mounted to the steering mechanism and turnable therewith, the support frame having at least two support frame members laterally spaced from one another; and
a windshield detachably mounted to the support frame via at least one locking structure comprising:
a plurality of locking members, each having a shaft connected at a first end to one of the support frame members and the windshield, and having an enlarged portion at a second end; and
a plurality of locking member receiving structures associated with the other of the support frame and the windshield, the plurality of locking member receiving structures arranged to releasably engage the plurality of locking members upon application of a predetermined force, the plurality of locking member receiving structures comprising a deformable, resilient material to permit the enlarged portions of the locking members to pass therethrough and retain the windshield on the support frame upon application of the predetermined force,
wherein engagement of the locking members and the locking member receiving structures detachably connects the windshield to the support frame.

2. The snowmobile of claim 1, wherein:
two of the plurality of locking members extend from end portions of each support member in a spaced apart relation to one another.

3. The snowmobile of claim 1 wherein:
the windshield comprises at least one of a transparent material, a tinted, transparent material, a translucent material, and an opaque material.

4. The snowmobile of claim 1, further comprising:
a pair of hand protecting members fixedly attached to either side of the windshield.

5. The snowmobile of claim 1, further comprising:
a pair of hand protecting members fixedly attached to the steering mechanism.

6. The snowmobile of claim 2, wherein:
the plurality of locking member receiving structures are disposed through the windshield.

7. The snowmobile of claim 1, wherein the support frame further comprises:
a windshield support; and
a support plate moveably attached to the windshield support at one end and attached to the steering mechanism of the snowmobile at a second end.

8. The snowmobile of claim 7, wherein the windshield support further comprises at least one grommet receiving hole and at least one adjustable bolt receiving hole.

9. The snowmobile of claim 8, wherein the support plate further comprises at least one slot, wherein upon assembly, the at least one slot aligns with the at least one adjustable bolt receiving hole of the windshield support.

10. The snowmobile of claim 7, wherein the windshield support is connected to the windshield through the at least one locking structure at one end thereof, a second end of the windshield support is connected to the support plate such that the position of the windshield support with the support plate is adjustable.

11. A snowmobile comprising:
a chassis;
a motor disposed on the chassis;
a ground engaging endless track disposed below the chassis and operatively connected to the motor;
at least one ski disposed on the chassis;
a steering mechanism operatively connected to the at least one ski;
a windshield detachably mounted to the snowmobile via at least one locking structure, the at least one locking structure comprising:
a locking member having a shaft connected at a first end to one of the snowmobile and the windshield and having an enlarged portion at a second end; and
a locking member receiving structure associated with the other of the snowmobile and the windshield, the locking member receiving structure arranged to releasably engage the locking member upon application of a predetermined force upon the windshield, the locking member receiving structure comprising a deformable, resilient material to permit the enlarged portion of the locking member to pass therethrough and retain the windshield on the snowmobile upon application of the predetermined force,
wherein engagement of the locking member and the locking member receiving structure detachably connects the windshield to the snowmobile.

12. The snowmobile of claim 11, wherein:
the shaft further comprises a plurality of shafts and the locking member receiving structure further comprises a plurality of locking member receiving structures.
13. The snowmobile of claim 11, wherein:
the windshield comprises at least one of a transparent material, a tinted, transparent material, a translucent material, and an opaque material.

14. The snowmobile of claim 11, further comprising:
a pair of hand protecting members fixedly attached to either side of the windshield.
15. The snowmobile of claim 11, further comprising:
a pair of hand protecting members fixedly attached to the steering mechanism.

\* \* \* \* \*